United States Patent
Ma et al.

(10) Patent No.: US 11,763,425 B2
(45) Date of Patent: Sep. 19, 2023

(54) HIGH RESOLUTION TIME-OF-FLIGHT DEPTH IMAGING

(71) Applicant: QUALCOMM Incorporated, San Diego, CA (US)

(72) Inventors: Jian Ma, San Diego, CA (US); Sergiu Radu Goma, San Diego, CA (US); Biay-Cheng Hseih, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/166,990

(22) Filed: Feb. 3, 2021

(65) Prior Publication Data

US 2022/0245762 A1 Aug. 4, 2022

(51) Int. Cl.
| | |
|---|---|
| *G06T 3/40* | (2006.01) |
| *G06T 7/80* | (2017.01) |
| *G06T 7/593* | (2017.01) |
| *G02B 26/08* | (2006.01) |

(52) U.S. Cl.
CPC ........ *G06T 3/4053* (2013.01); *G02B 26/0833* (2013.01); *G06T 7/593* (2017.01); *G06T 7/80* (2017.01); *G06T 2207/10028* (2013.01)

(58) Field of Classification Search
CPC ........ G06T 3/4053; G06T 7/593; G06T 7/80; G06T 2207/10028; G02B 26/0833; G01S 7/4817; G01S 7/4814; G01S 17/894; G01S 7/4816
See application file for complete search history.

(56) References Cited

U.S. PATENT DOCUMENTS

| | | |
|---|---|---|
| 2013/0234029 A1 | 9/2013 | Bikumandla |
| 2014/0055771 A1 | 2/2014 | Oggier |
| 2017/0053382 A1 | 2/2017 | Lelescu et al. |
| 2017/0131388 A1 | 5/2017 | Campbell et al. |
| 2018/0203102 A1 | 7/2018 | Wang et al. |

(Continued)

FOREIGN PATENT DOCUMENTS

WO 2018055449 A2 3/2018

OTHER PUBLICATIONS

International Search Report and Written Opinion—PCT/US2022/013886—ISA/EPO—dated May 11, 2022.

*Primary Examiner* — Chan S Park
*Assistant Examiner* — Daniel C Chang
(74) *Attorney, Agent, or Firm* — Polsinelli/Qualcomm

(57) ABSTRACT

Techniques and systems are provided for high resolution time-of-flight (ToF) depth imaging. In some examples, an apparatus includes a projection system including one or more light-emitting devices, each light-emitting device being configured to illuminate at least one portion of an entire field-of-view (FOV) of the projection system. The entire FOV includes a plurality of FOV portions. The apparatus also includes a receiving system including a sensor configured to sequentially capture a plurality of images based on a plurality of illumination reflections corresponding to light emitted by the one or more light-emitting devices. Each image of the plurality of images corresponds to one of the plurality of FOV portions. An image resolution associated with each image corresponds to a full resolution of the sensor. The apparatus further includes a processor configured to generate, using the plurality of images, an increased resolution depth map associated with the entire FOV.

35 Claims, 14 Drawing Sheets

(56) References Cited

U.S. PATENT DOCUMENTS

2019/0154809 A1      5/2019   Akkaya et al.
2020/0284883 A1*     9/2020   Ferreira .................. G01S 17/10
2022/0050203 A1*     2/2022   David Keilaf ....... B60Q 1/0023

* cited by examiner

1100

---

Illuminate At Least One Portion Of An Entire Field-of-View (FOV) Of A Projection System Including One Or More Light-emitting Devices, Wherein The Entire FOV Includes A Plurality Of FOV Portions
1102

---

Sequentially Capture, By A Sensor Of A Receiving System, A Plurality Of Images Based On A Plurality Of Illumination Reflections Corresponding To Light Emitted By The One Or More Light-emitting Devices, Wherein Each Image Of The Plurality Of Images Corresponds To One Of The Plurality Of FOV Portions, And Wherein An Image Resolution Associated With Each Image Of The Plurality Of Images Corresponds To A Full Resolution Of The Sensor
1104

---

Generate, Using The Plurality Of Images, An Increased Resolution Depth Map Associated With The Entire FOV
1106

FIG. 11

HIGH RESOLUTION TIME-OF-FLIGHT DEPTH IMAGING

FIELD

The present disclosure generally relates to time-of-flight (ToF) sensing. In some examples, aspects of the present disclosure are related to increasing the image resolution of depth maps generated based on ToF data by sequentially scanning portions of a field-of-view (FOV) of an imaging system.

BACKGROUND

Image sensors are commonly integrated into a wide array of electronic devices such as cameras, mobile phones, autonomous systems (e.g., autonomous drones, cars, robots, etc.), smart wearables, extended reality (e.g., augmented reality, virtual reality, mixed reality) devices, and many other devices. The image sensors allow users to capture video and images from any electronic device equipped with an image sensor. The video and images can be captured for recreational use, professional photography, surveillance, and automation, among other applications. The video and images captured by image sensors can be manipulated in various ways to increase the quality of the video or images and create certain artistic effects.

In some cases, light signals and image data captured by an image sensor can be analyzed to identify certain characteristics about the image data and/or the scene captured by the image data, which can then be used to modify the captured image data or perform various tasks. For example, light signals and/or image data can be analyzed to estimate a distance of the scene captured by the image data. Estimating distance information can be useful for a variety of applications, such as three-dimensional (3D) photography, extended reality experiences, object scanning, autonomous vehicle operation, Earth topography measurements, computer vision systems, facial recognition systems, robotics, gaming, and creating various artistic effects, such as blurring and bokeh effects (e.g., out-of-focus effects). However, estimating distance information with sufficient resolution and/or accuracy can be prohibitively power and compute intensive.

SUMMARY

Systems and techniques are described herein that can be implemented to perform high resolution time-of-flight (ToF) depth imaging. According to at least one example, apparatuses are provided for high resolution ToF depth imaging. An example apparatus can include a projection system including one or more light-emitting devices, each light-emitting device of the one or more light-emitting devices being configured to illuminate at least one portion of an entire field-of-view (FOV) of the projection system. The entire FOV can include a plurality of FOV portions. The apparatus can also include a receiving system including a sensor configured to sequentially capture a plurality of images based on a plurality of illumination reflections corresponding to light emitted by the one or more light-emitting devices. Each image of the plurality of images corresponds to one of the plurality of FOV portions. Further, an image resolution associated with each image of the plurality of images corresponds to a full resolution of the sensor. The apparatus can also include a memory (or multiple memories) and a processor or multiple processors (e.g., implemented in circuitry) coupled to the memory (or memories). The processor (or processors) can be configured to generate, using the plurality of images, an increased resolution depth map associated with the entire FOV.

In another example, an apparatus can include means for illuminating a plurality of field-of-view (FOV) portions of an entire FOV of the projection system, wherein the means for illuminating is configured to sequentially illuminate at least one portion of the entire FOV; means for sequentially capturing a plurality of images based on a plurality of illumination reflections corresponding to light emitted by the means for illuminating, wherein each image of the plurality of images corresponds to one of the plurality of FOV portions, and wherein an image resolution associated with each image of the plurality of images corresponds to a full resolution of the means for receiving; and means for generating, using the plurality of images, an increased resolution depth map associated with the entire FOV.

In another example, methods for high resolution ToF depth imaging are provided. An example method can include illuminating, using one or more light-emitting devices of a projection system, a plurality of FOV portions of an entire FOV of the projection system, wherein each light-emitting device of the one or more light-emitting devices is configured to illuminate at least one portion of the entire FOV. The method can also include sequentially capturing, by a sensor of a receiving system, a plurality of images based on a plurality of illumination reflections corresponding to light emitted by the one or more light-emitting devices. Each image of the plurality of images corresponds to one of the plurality of FOV portions. Further, an image resolution associated with each image of the plurality of images corresponds to a full resolution of the sensor. The method can also include generating, using the plurality of images, an increased resolution depth map associated with the entire FOV.

In another example, non-transitory computer-readable media are provided for high resolution ToF depth imaging. An example non-transitory computer-readable medium can store instructions that, when executed by one or more processors, cause the one or more processors to: illuminate, using one or more light-emitting devices of a projection system, a plurality of field-of-view (FOV) portions of an entire FOV of the projection system, wherein each light-emitting device of the one or more light-emitting devices is configured to illuminate at least one portion of the entire FOV; sequentially capture, using a sensor of a receiving system, a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to a full resolution of the sensor; and generate, using the plurality of images, an increased resolution depth map associated with the entire FOV.

In some aspects, the method, apparatuses, and computer-readable medium described above can include: illuminating each of the plurality of FOV portions in a sequential illumination order, the sequential illumination order including illuminating a single FOV portion at a time; receiving each illumination reflection of the plurality of illumination reflections in a sequential receiving order that corresponds to the sequential illumination order; and generating each image of the plurality of images based on each illumination reflection of the plurality of illumination reflections. In some examples, illuminating each of the plurality of FOV portions in the sequential illumination order can include: illuminating a first FOV portion of the plurality of FOV portions; receiving a first illumination reflection corresponding to the first FOV portion; after receiving the first illumination reflection, illuminating a second FOV portion of the plurality of FOV portions; and receiving a second illumination reflection corresponding to the second FOV portion.

In some aspects, the one or more light-emitting devices can include a plurality of light-emitting devices. In some cases, the projection system can include a plurality of projection lenses, each projection lens of the plurality of projection lenses being configured to project light emitted by one of the plurality of light-emitting devices towards a different FOV portion of the plurality of FOV portions. In some cases, each projection lens of the plurality of projection lenses can be positioned above the plurality of light-emitting devices. In some examples, the projection system includes one or more diffusers positioned relative to the plurality of projection lenses. For instance, the one or more diffusers can be configured to diffuse the light emitted by the plurality of light-emitting devices. In some examples, the projection system includes a segmented prism array. For instance, the segmented prism array can be configured to direct the light to each FOV portion of the plurality of FOV portions.

In some aspects, the one or more light-emitting devices can include a single light-emitting device. In some cases, the projection system can include a scanning mirror configured to project light emitted by the single light-emitting device towards different FOV portions of the plurality of FOV portions when oriented at different orientations. In one example, the scanning mirror can be a micro electro mechanical system (MEMS) mirror. In some aspects, the scanning mirror can be positioned above the single light-emitting device. In some cases, each of the different orientations of the scanning mirror can correspond to a different orientation angle between the scanning mirror and a plane of the single light-emitting device. In some examples, the projection system includes one or more diffusers positioned relative to the scanning mirror. For instance, the one or more diffusers can be configured to diffuse the light emitted by the single light-emitting device.

In some aspects, the receiving system includes an array of image lenses. Each image lens of the array of image lenses can be configured to project, to the sensor, light associated with a different portion of the scene corresponding to a respective FOV portion of the plurality of FOV portions.

In some aspects, the method, apparatuses, and computer-readable medium described above can include a filter positioned above the sensor. The filter is configured to transmit light with a frequency corresponding to a frequency of light emitted by the one or more light-emitting devices.

In some aspects, the method, apparatuses, and computer-readable medium described above can include synchronizing the projection system and the receiving system based at least in part on: sending, to the projection system, a first control signal directing the projection system to illuminate a particular FOV portion of the plurality of FOV portions; and sending, to the receiving system, a second control signal directing the receiving system to associate an illumination reflection received by the sensor with the particular FOV portion, wherein the first control signal and the second control signal are time-synchronized.

In some aspects, a first FOV portion of the plurality of FOV portions can partially overlap at least a second FOV portion of the plurality of FOV portions.

In some aspects, generating the increased resolution depth map associated with the entire FOV can include: generating a plurality of partial distance measurements, each of the plurality of partial distance measurements corresponding to one of the plurality of illumination reflections; and combining the plurality of partial distance measurements. In some examples, an image resolution of the increased resolution depth map can correspond to a maximum resolution of the sensor multiplied by a number of the plurality of FOV portions.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, an autonomous vehicle, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 11 is a flow diagram illustrating an example of a process for high resolution ToF depth imaging; in accordance with some examples.

DETAILED DESCRIPTION

Figure 1:
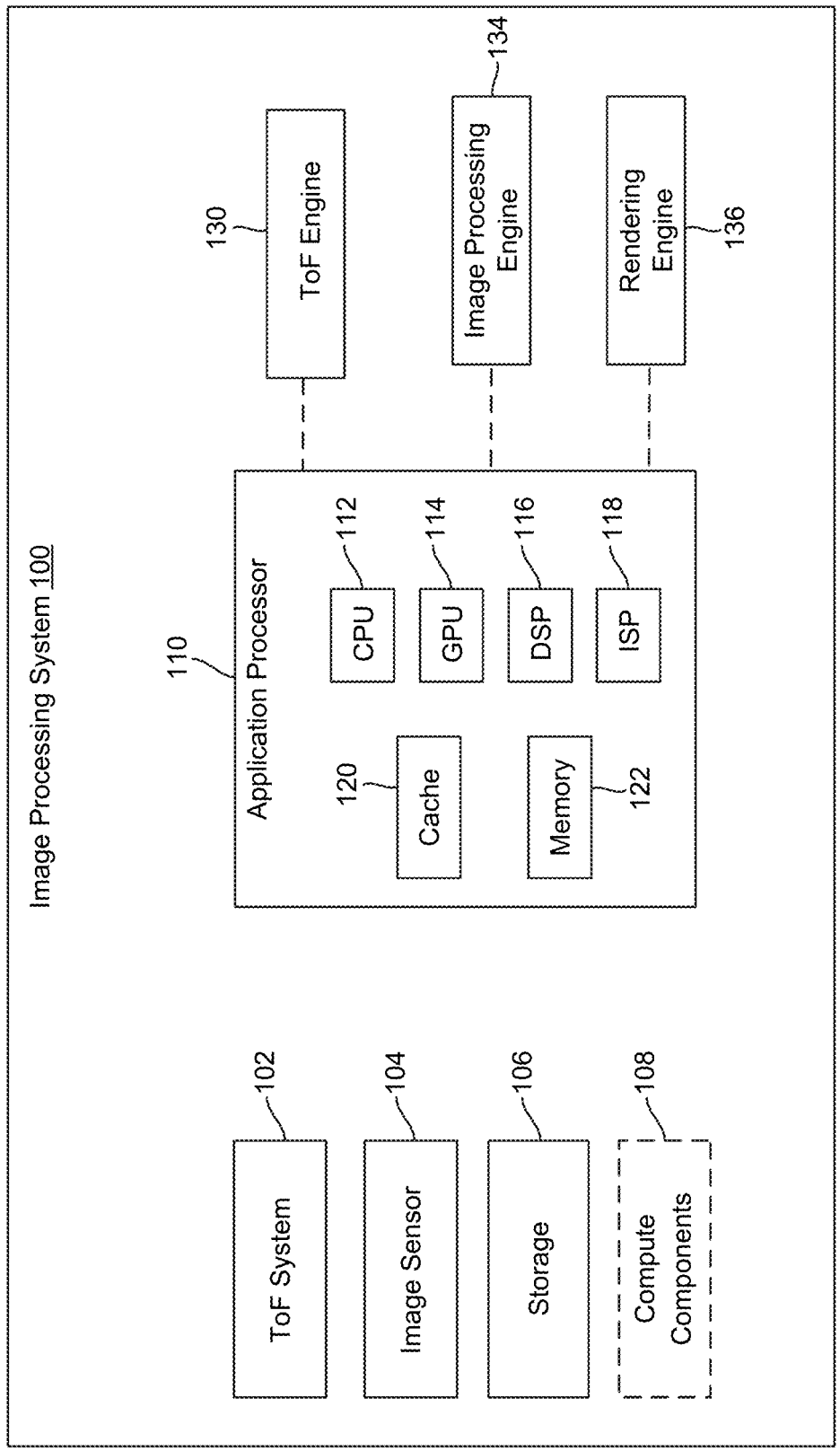
FIG. 1 is a simplified block diagram illustrating an example image processing system for time-of-flight (ToF) signal processing, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

Image sensors are commonly integrated into a wide variety of electronic devices, such as cameras, mobile phones, autonomous systems (e.g., autonomous drones, cars, robots, etc.), extended reality (e.g., augmented reality, virtual reality, mixed reality) devices, Internet-of-Things (IoT) devices, smart wearables, and many other devices. Video and image recording capabilities have become more widespread as increasingly more electronic devices are equipped with such image sensors. In addition, the image processing capabilities of electronic devices have continuously improved, allowing image data to be manipulated to produce higher quality videos and images, generate a wide array of artistic effects, and implement image data in a variety of applications. For example, light signals and image data captured by sensors can be analyzed to identify certain characteristics about the image data and/or the scene captured by the image data. This information can then be used to modify the captured image data or perform various tasks. For example, light signals and/or image data can be analyzed to estimate a distance of objects within the scene captured by the image data.

Time-of-flight (ToF) sensor systems can use light (e.g., infrared (IR) light, near-infrared (NIR) light, and/or other light) to determine depth and/or distance information about a target (e.g., a surrounding/nearby scene, one or more surrounding/nearby objects, etc.). A ToF sensor system can include a light emitter configured to emit a light signal towards a target, which can hit the target and reflect back to the ToF sensor systems. A ToF sensor system can also include a sensor configured to detect and/or measure the returned/reflected light, which can then be used to determine depth and/or distance information for the target. The distance of the target relative to a ToF sensor system can be used to perform depth mapping. The distance of the target can be calculated through direct ToF or indirect ToF.

The resolution (e.g., image resolution) of some ToF sensor systems can correspond to the number of reflected light signals the ToF sensor system can receive and process at a time. For example, the image resolution of a ToF sensor system can correspond to the number of pixels (e.g., photosensitive elements) of a ToF sensor. In many cases, ToF sensor technologies utilize complex hardware and/or extensive processing power. As a result, it can be impractical and/or impossible (e.g., cost-prohibitive) to increase the resolution (e.g., number of pixels) of a ToF sensor. For instance, some existing ToF systems are limited to a resolution of no more than 320×240 pixels. Such a low resolution may be insufficient for various types of imaging and sensing applications, such as long distance imaging, wide field-of-view (FOV) imaging, autonomous vehicle operation, machine vision systems, facial recognition systems, digital measurement systems, gaming, robotics, among others. Thus, it is beneficial to develop improved ToF systems and techniques for efficiently capturing high-resolution image depth information.

The present disclosure describes systems, apparatuses, methods, and computer-readable media (collectively referred to as "systems and techniques") for providing high resolution ToF depth imaging. The systems and techniques described herein provide the ability for a ToF system to generate depth maps (e.g. depth image maps) with a resolution that exceeds the full (e.g., maximum) resolution of a ToF sensor of the ToF system. In addition, the ToF system can generate high-resolution depth maps without incurring substantial delays in processing time. To generate high-resolution depth maps, the ToF system can capture depth information associated with portions of an entire field-of-view (FOV) of the ToF system. In some cases, the ToF system can sequentially capture depth information associated with individual portions (referred to as FOV portions) of the entire FOV. For example, the ToF system can "scan" through the FOV portions. The ToF system can utilize a single ToF sensor (e.g., the same ToF sensor) to scan each FOV portion. The individual FOV portions can correspond to (or approximately correspond to) the FOV of the single ToF sensor. The ToF system can generate a depth map corresponding to the entire FOV by combining the depth information obtained from each FOV portion. Thus, the resolution (e.g., image resolution) of the depth map of the entire FOV corresponds to the resolution of the single ToF sensor multiplied by the number of scanned FOV portions. Further, because each FOV portion is smaller than the total FOV, the light projected by the ToF device onto each FOV portion is highly concentrated (e.g., as compared to the concentration of light projected by ToF systems that illuminate an entire FOV at once). This increase in illumination results in a corresponding decrease in exposure time (e.g., the amount of time required to obtain accurate distance measurements), thereby enabling the ToF system to maintain a high frame rate while generating or updating a depth map. For example, if the ToF system divides an FOV into x sub-FOVs, the ToF system can generate depth maps that have x times higher resolution with the same latency as ToF systems that do not sequentially scan FOV portions.

In some examples, the ToF system can include a projector system configured to sequentially illuminate individual FOV portions. The projector system can include one or more light-emitting devices. In one example, a light-emitting device can include a plurality of vertical cavity surface emitting lasers (VCSELs) arranged in a VCSEL array. In some cases, each VCSEL in the VCSEL array can emit light with a narrowband near infrared (NIR) light. The projector system can also include one or more light-directing mechanisms (e.g., one or more projection lenses, prisms, a combination of projection lenses and one or more prisms, and/or scanning mirrors) that appropriately direct the light emitted by the light-emitting devices.

In one example, the projector system can include multiple light-emitting devices (e.g., multiple VSCEL arrays), with each light-emitting device being configured to illuminate a particular FOV portion of the entire FOV. For instance, the number of light-emitting devices can equal the number of FOV portions into which the FOV is divided. Each light-emitting device can be selectively and/or individually activated (e.g., such that only a single light-emitting device is emitting light toward a respective FOV portion at any point in time). In such an example, the one or more light-directing mechanisms can include a lens array of multiple projection lenses and/or a prism (or multiple prisms in some cases). For instance, each projection lens of the lens array can correspond to a respective light-emitting device. The multiple projection lenses of the lens array can be positioned (e.g., held at a particular angle) to ensure that light emitted by each light-emitting device illuminates an appropriate FOV portion. Using multiple light-emitting devices in combination with a lens array and/or a prism (or multiple prisms) can ensure that no mechanical movement is necessary to capture distance measurements for the entire FOV.

In another example, the projector system can include a single light-emitting device (e.g., a single VSCEL array) configured to selectively illuminate individual FOV portions. In such an example, the one or more light-directing mechanisms can include a scanning mirror (e.g., a micro electrical mechanism system (MEMS)) mirror). The orientation of the scanning mirror can be adjusted (e.g., moved to a particular angle) periodically to sequentially reflect light emitted by the light-emitting device in order to illuminate each FOV portion. While using a scanning mirror may involve mechanical movement of the ToF system, the mechanical fatigue of the scanning mirror may be negligible. Thus, the mechanical movement of the scanning mirror may not degrade the performance of the projector system over the lifetime of the scanning mirror. Using the scanning mirror can enable only a single light-emitting device to be used by the ToF system.

The ToF system can generate a complete depth map of an entire FOV by combining distance measurements corresponding to individual FOV portions of the entire FOV. For instance, the ToF system can "stitch" together frames corresponding to individual FOV portions. The frames can be combined as the frames are captured, or after all of the frames have been captured. In some cases, frames corresponding to adjacent FOV portions can include a predetermined amount of overlap (e.g., a predetermined number of overlapping pixels). The overlap may enable the ToF system to efficiently and/or seamlessly compile individual frames into a cohesive depth map of an entire FOV.

In some cases, the ToF system can synchronize the projector system and the ToF sensor in accordance with a synchronization scheme. By performing the synchronization, the ToF system can ensure that the ToF sensor determines distance measurements associated with a particular FOV portion when that particular FOV portion is illuminated. In one example, the ToF system can include a controller that sends a synchronization signal to the projector system. If the projector system includes multiple light-emitting devices (e.g., multiple VCSEL arrays), the synchronization signal can indicate which light-emitting device is currently to be turned on. If the projector system includes a scanning mirror, the synchronization signal can indicate a particular angle at which the scanning mirror is to be oriented. In addition, the controller can send a synchronization signal to the ToF sensor. This synchronization signal can indicate, to the sensor, which FOV portion is currently being illuminated by the projector system. Based on the synchronization signal, the ToF sensor can accurately label distance measurements associated with individual FOV portions as the FOV portions are sequentially illuminated.

Further details regarding high resolution ToF systems are provided herein with respect to various figures. FIG. 1 is a diagram illustrating an example image processing system 100 for time-of-flight (ToF) signal processing. In this illustrative example, the image processing system 100 can include a ToF system 102, an image sensor 104, a storage 106, and an application processor 110. In some examples, the image processing system 100 can optionally include other compute components 108 such as, for example, a central processing unit (CPU), a graphics processing unit (GPU), a digital signal processor (DSP), and/or an image signal processor (ISP), which the image processing system 100 can use to perform one or more of the operations/functionalities described herein with respect to the application processor 110. In some cases, the application processor 110 and/or the other compute components 108 can implement a ToF engine 130, an image processing engine 134, and/or a rendering engine 136.

It should be noted that, in some examples, the application processor 110 and/or the other compute components 108 can also implement one or more computing engines that are not shown in FIG. 1. The ToF engine 130, the image processing engine 134, and the rendering engine 136 are provided herein for illustration and explanation purposes and other possible computing engines are not shown for the sake of simplicity. Also, for illustration and explanation purposes, the ToF engine 130, the image processing engine 134, the rendering engine 136, and their various operations disclosed operations will be described herein as being implemented by the application processor 110. However, one of skill in the art will recognize that, in other examples, the ToF engine 130, the image processing engine 134, the rendering engine 136, and/or their various operations disclosed operations can be implemented by the other compute components 108.

The image processing system 100 can be part of, or implemented by, a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a television, a display device, a digital media player, a gaming console, a video streaming device, a head-mounted display (HMD), an extended reality (XR) device, a drone, a computer in a car, an IoT (Internet-of-Things) device, a smart wearable device, or any other suitable electronic device(s). In some implementations, the ToF system 102, the image sensor 104, the storage 106, the other compute components 108, the application processor 110, the ToF engine 130, the image processing engine 134, and the rendering engine 136 can be part of the same computing device.

For example, in some cases, the ToF system 102, the image sensor 104, the storage 106, the other compute components 108, the application processor 110, the ToF engine 130, the image processing engine 134, and the rendering engine 136 can be integrated into a camera, smartphone, laptop, tablet computer, smart wearable device, HMD, XR device, IoT device, gaming system, and/or any other computing device. However, in some implementations, one or more of the ToF system 102, the image sensor 104, the storage 106, the other compute components 108, the application processor 110, the ToF engine 130, the image processing engine 134, and/or the rendering engine 136 can be part of, or implemented by, two or more separate computing devices.

The ToF system 102 can use light, such as near infrared light (NIR), to determine depth and/or distance information about a target (e.g., a surrounding/nearby scene, one or more surrounding/nearby objects, etc.). In some examples, the ToF system 102 can measure both the distance and intensity of each pixel in a target such as a scene. The ToF system 102 can include a light emitter to emit a light signal towards a target (e.g., a scene, an object, etc.), which can hit the target and return/reflect to the ToF system 102. The ToF system 102 can include a sensor to detect and/or measure the returned/reflected light, which can then be used to determine depth and/or distance information for the target. The distance of the target relative to the ToF system 102 can be used to perform depth mapping. The distance of the target can be calculated through direct ToF or indirect ToF.

In direct ToF, the distance can be calculated based on the travel time of the emitted light pulse signal and the returned/reflected light pulse signal (e.g., the time from when the light signal was emitted and the returned/reflected light signal was received). For example, the round-trip distance of the emitted light signal and the returned/reflected light signal can be calculated by multiplying the travel time of the emitted light pulse signal and the returned/reflected light pulse signal by the speed of light, commonly denoted c. The round-trip distance calculated can then be divided by 2 to determine the distance from the ToF system 102 to the target.

In indirect ToF, the distance can be calculated by sending modulated light toward a target and measuring the phase of the returned/reflected light. Knowing the frequency (f) of the emitted light, the phase shift of the returned/reflected light, and the speed of light allows the distance to the target to be calculated. For example, runtime differences between the path of the emitted light and the path of the returned/reflected light result in a phase shift of the returned/reflected light. The phase difference between the emitted light and the returned/reflected light and the modulation frequency (f) of the light can be used to calculate the distance between the ToF system 102 and the target. For example, the formula for the distance between the ToF system 102 and the target can be $(c/2f) \times \text{Phase Shift}/2\pi$. As this shows, a higher frequency of light can provide a higher measurement accuracy but will result in a shorter maximum distance that can be measured.

Accordingly, in some examples, dual frequencies can be used to improve the measuring accuracy and/or distance, as further explained herein. For example, a 60 MHz light signal can be used to measure a target 2.5 meters away, and a 100 MHz light signal can be used to measure a target 1.5 meters away. In a dual frequency scenario, both the 60 MHz and the 100 MHz light signals can be used to calculate a distance to a target.

The image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 104 can be part of a camera or computing device such as a digital camera, a video camera, an IP camera, a smartphone, a smart television, a game system, etc. In some examples, the image sensor 104 can include multiple image sensors, such as rear and front sensor devices, and can be part of a dual-camera or other multi-camera assembly (e.g., including two camera, three cameras, four cameras, or other number of cameras). The image sensor 104 can capture image and/or video frames (e.g., raw image and/or video data), which can then be processed by the application processor 110, the ToF engine 130, the image processing engine 134, and/or the rendering engine 136, as further described herein.

The storage 106 can be any storage device(s) for storing data. Moreover, the storage 106 can store data from any of the components of the image processing system 100. For example, the storage 106 can store data from the ToF system 102 (e.g., ToF sensor data or measurements), the image sensor 104 (e.g., frames, videos, etc.), data from and/or used by the other compute components 108 and/or the application processor 110 (e.g., processing parameters, image data, ToF measurements, depth maps, tuning parameters, processing outputs, software, files, settings, etc.), data from and/or used by the ToF engine 130 (e.g., one or more neural networks, image data, tuning parameters, auxiliary metadata, ToF sensor data, ToF measurements, depth maps, training datasets, etc.), image processing engine 134 (e.g., image processing data and/or parameters, etc.), data from and/or used by the rendering engine 136 (e.g., output frames), an operating system of the image processing system 100, software of the image processing system 100, and/or any other type of data.

The application processor 110 can include, for example and without limitation, a CPU 112, a GPU 114, a DSP 116, and/or an ISP 118, which the application processor 110 can use to perform various compute operations such as image/video processing, ToF signal processing, graphics rendering, machine learning, data processing, calculations, and/or any other operations. In the example shown in FIG. 1, the application processor 110 implements a ToF engine 130, an image processing engine 134, and a rendering engine 136. In other examples, the application processor 110 can also implement one or more other processing engines. Moreover, in some cases, the ToF engine 130 can implement one or more machine learning algorithms (e.g., one or more neural networks) configured to perform ToF signal processing and/or generate depth maps.

In some cases, the application processor 110 can also include a memory 122 (e.g., random access memory (RAM), dynamic RAM, etc.) and a cache 120. The memory 122 can include one or more memory devices, and can include any type of memory such as, for example, volatile memory (e.g., RAM, DRAM, SDRAM, DDR, static RAM, etc.), flash memory, flashed-based memory (e.g., solid-state drive), etc. In some examples, the memory 122 can include one or more DDR (e.g., DDR, DDR2, DDR3, DDR4, etc.) memory modules. In other examples, the memory 122 can include other types of memory module(s). The memory 122 can be used to store data such as, for example, image data, ToF data, processing parameters (e.g., ToF parameters, tuning parameters, etc.), metadata, and/or any type of data. In some examples, the memory 122 can be used to store data from and/or used by the ToF system 102, the image sensor 104, storage 106, the other compute components 108, the application processor 110, the ToF engine 130, the image processing engine 134, and/or the rendering engine 136.

The cache 120 can include one or more hardware and/or software components that store data so that future requests for that data can be served faster than if stored on the memory 122 or storage 106. For example, the cache 120 can include any type of cache or buffer such as, for example, system cache or L2 cache. The cache 120 can be faster and/or more cost effective than the memory 122 and storage 106. Moreover, the cache 120 can have a lower power and/or operational demand or footprint than the memory 122 and storage 106. Thus, in some cases, the cache 120 can be used to store/buffer and quickly serve certain types of data expected to be processed and/or requested in the future by one or more components (e.g., application processor 110) of the image processing system 100, such as image data or ToF data.

In some examples, the operations for the ToF engine 130, the image processing engine 134, and the rendering engine 136 (and any other processing engines) can be implemented by any of the compute components in the application processor 110. In one illustrative example, the operations of the rendering engine 136 can be implemented by the GPU 114, and the operations of the ToF engine 130, the image processing engine 134, and/or one or more other processing engines can be implemented by the CPU 112, the DSP 116, and/or the ISP 118. In some examples, the operations of the ToF engine 130, and the image processing engine 134 can be implemented by the ISP 118. In other examples, the operations of the ToF engine 130, and/or the image processing engine 134 can be implemented by the ISP 118, the CPU 112, the DSP 116, and/or a combination of the ISP 118, the CPU 112, and the DSP 116.

In some cases, the application processor 110 can include other electronic circuits or hardware, computer software, firmware, or any combination thereof, to perform any of the various operations described herein. In some examples, the ISP 118 can receive data (e.g., image data, ToF data, etc.) captured or generated by the ToF system 102 and/or the image sensor 104 and process the data to generate output depth maps and/or frames. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the ISP 118 can implement one or more processing engines (e.g., ToF engine 130, image processing engine 134, etc.) and can perform ToF signal processing and/or image processing operations, such as depth calculation, depth mapping, filtering, demosaicing, scaling, color correction, color conversion, noise reduction filtering, spatial filtering, artifact correction, etc. The ISP 118 can process data from the ToF system 102, the image sensor 104, storage 106, memory 122, cache 120, other components in the application processor 110, and/or data received from a remote source, such as a remote camera, a server or a content provider.

While the image processing system 100 is shown to include certain components, one of ordinary skill will appreciate that the image processing system 100 can include more or fewer components than those shown in FIG. 1. For example, the image processing system 100 can also include, in some instances, one or more other memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 10.

Figure 2A:
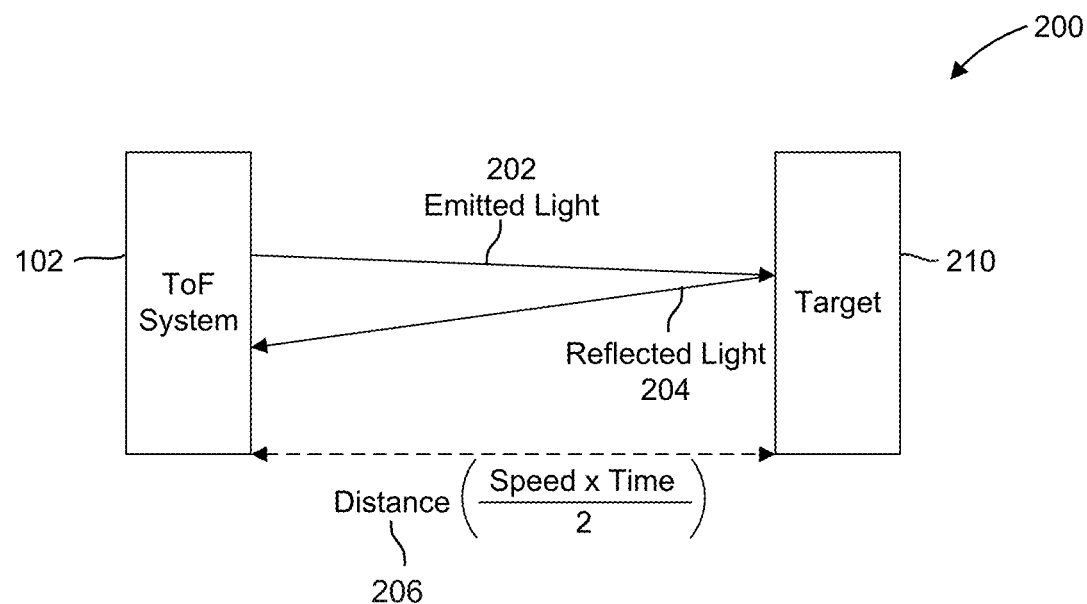
FIG. 2A is a simplified block diagram illustrating an example of a direct ToF sensing procedure, in accordance with some examples of the present disclosure.

FIG. 2A is a simplified block diagram illustrating an example of a direct ToF sensing procedure 200. In this example, the ToF system 102 first emits light pulse 202 towards a target 210. The target 210 can include, for example, a scene, one or more objects, one or more animals, one or more people, etc. The light pulse 202 can travel to the target 210 until it hits the target 210. When the light pulse 202 hits the target 210, at least some portion of the light pulse 202 can be reflected back to the ToF system 102.

Thus, the ToF system 102 can receive reflected light pulse 204 including at least some portion of the light pulse 202 reflected back from the target 210. The ToF system 102 can sense the reflected light pulse 204 and calculate the distance 206 to the target 210 based on the reflected light pulse 204. To calculate the distance 206, the ToF system 102 can calculate the total time traveled by the emitted light pulse 202 and the reflected light 204 (e.g., the time from when the light pulse 202 was emitted to when the reflected light pulse 204 was received). The ToF system 102 can multiply the total time traveled by the emitted light pulse 202 and the reflected light pulse 204 by the speed of light (c) to determine the total distance traveled by the light pulse 202 and the reflected light pulse 204 (e.g., the round trip time). The ToF system 102 can then divide the total time traveled by 2 to obtain the distance 206 from the ToF system 102 to the target 210.

Figure 2B:
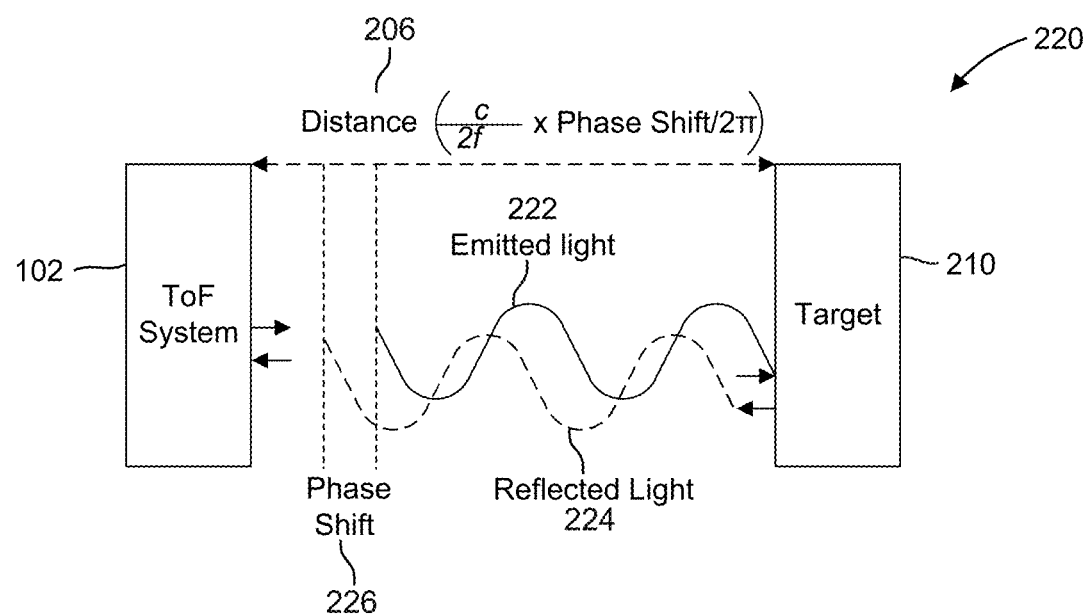
FIG. 2B is a simplified block diagram illustrating an example of an indirect ToF sensing procedure, in accordance with some examples of the present disclosure.

FIG. 2B is a simplified block diagram illustrating an example of an indirect ToF sensing procedure 220. In this example, the phase shift of reflected light can be calculated to determine depth and distance for the target 210. Here, the ToF system 102 first emits modulated light 222 towards the target 210. The modulated light 222 can have a certain known or predetermined frequency. The modulated light 222 can travel to the target 210 until it hits the target 210. When the modulated light 222 hits the target 210, at least some portion of the modulated light 222 can be reflected back to the ToF system 102.

The ToF system 102 can receive the reflected light 224 and determine the phase shift 226 of the reflected light 224 and the distance 206 to the target 210 using the formula distance $(206)=(c/2f) \times \text{Phase Shift}/2\pi$, where f is the frequency of the modulated light 222 and c is the speed of light.

In some cases, when calculating depth and distance (e.g., 206), one or more factors that affect how the light is reflected can be taken into account or used to tune the calculations. For example, objects and surfaces can have specific characteristics which can cause light to reflect differently. To illustrate, different surfaces can have different indexes of refraction, which can affect how light travels or interfaces with the surfaces and/or the material(s) in the surfaces. Moreover, non-uniformities, such as material irregularities or scattering centers, can cause light to be reflected, refracted, transmitted, or absorbed, and can sometimes cause loss of energy. Thus, when light hits a surface, it can be absorbed, reflected, transmitted, etc. The proportion of light reflected by the surface is called its reflectance. However, the reflectance does not only depend on the surface (e.g., index of refraction, material properties, uniformities or non-uniformities, etc.), but can also depend on the type of light being reflected and the surrounding environment (e.g., temperature, ambient light, water vapor, etc.). Therefore, as further explained below, in some cases, information about the surrounding environment, the type of light, and/or characteristics of the target 210 can be factored in when calculating the distance 206 and/or depth information for the target 210.

Figure 3:
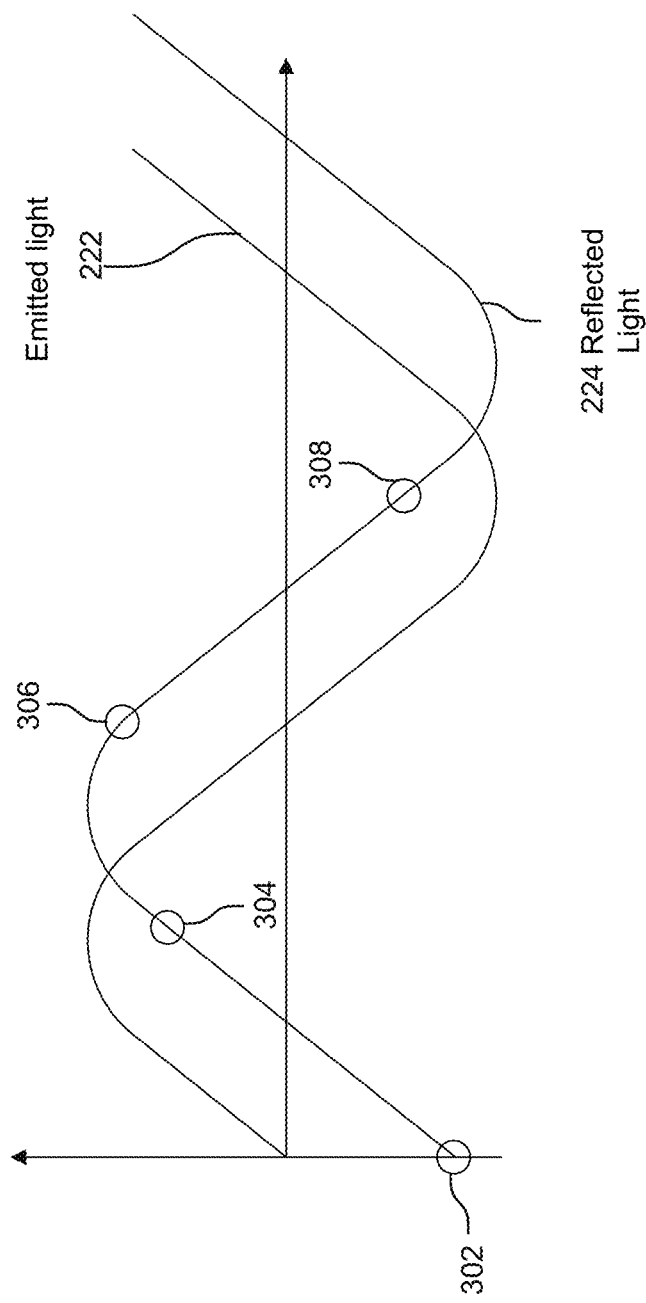
FIG. 3 is a diagram illustrating an example technique for measuring the phase angle of a light signal, in accordance with some examples of the present disclosure.

FIG. 3 is a diagram illustrating an example technique for measuring the phase angle of a light signal. In this example, the ToF system 102 emits a modulated light signal 222 and receives a reflected light 224. The ToF system 102 measures the amplitude (A) of the reflected light 224 at four different points 302, 304, 306, and 308, to determine amplitude $A_1$ at measurement point 302, amplitude $A_2$ at measurement point 304, amplitude $A_3$ at measurement point 306, and amplitude $A_4$ at measurement point 308. The measurement points 302, 304, 306, and 308 can be equally spaced points (e.g., 0°, 90°, 180°, 270°).

The phase angle of the reflected light 224 can be represented by the following equation:

$$\varphi = \text{ArcTan}\left(\frac{A_2 - A_4}{A_1 - A_3}\right) \qquad \text{Eq. 1}$$

Equation 1 illustrates the relationship between the amplitude measurements at points 302, 304, 306, and 308 and the phase angle of the reflected light 224. The ratio of the difference between $A_1$ and $A_3$ and the difference between $A_2$ and $A_4$ is equal to the tangent of the phase angle.

Figure 4:
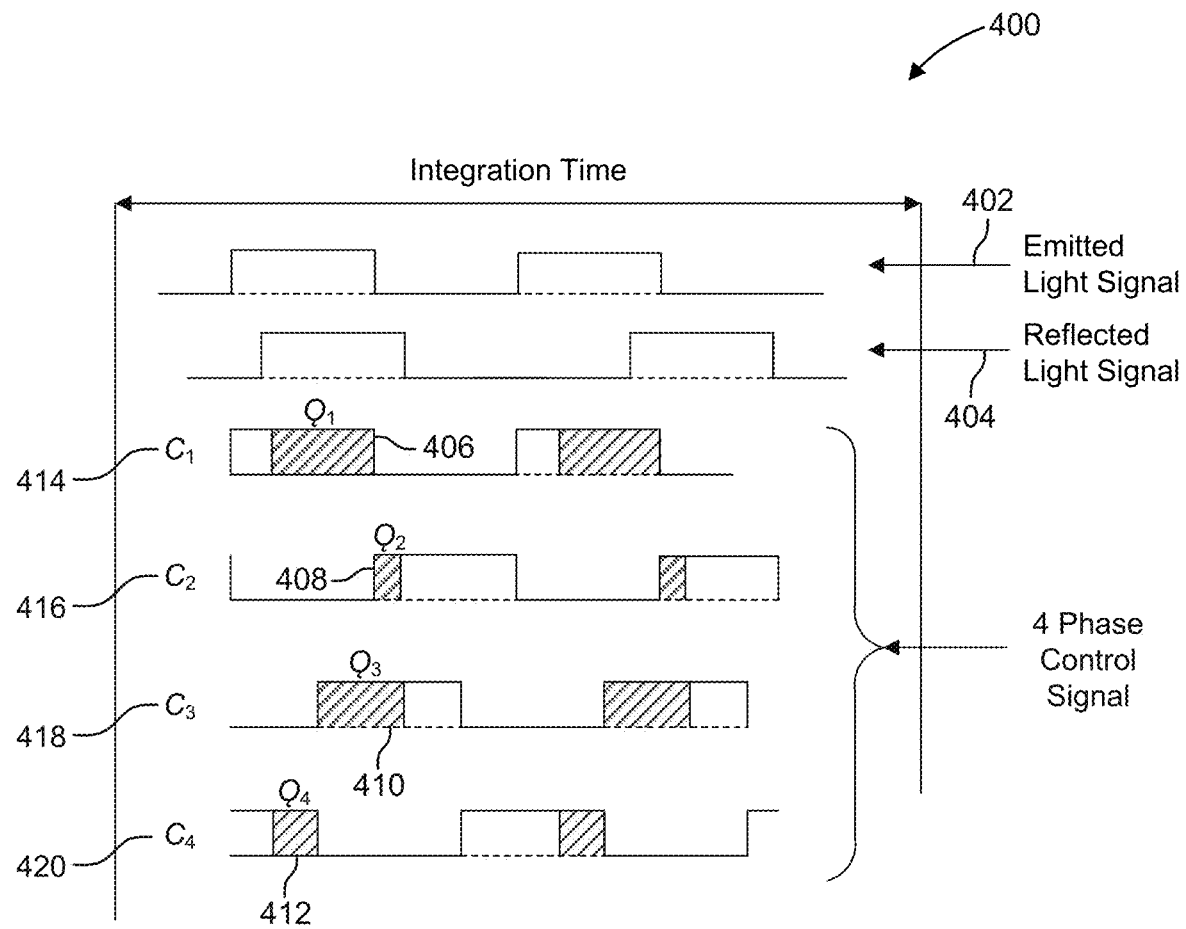
FIG. 4 is a diagram illustrating a continuous wave method for ToF sensing, in accordance with some examples of the present disclosure.

FIG. 4 is a diagram illustrating a continuous wave method 400 for ToF sensing. In this example, the light signal 402 emitted and the reflected light signal 404 can be cross-correlated to determine a phase delay of the reflected light signal 404. The light signal 402 can first be emitted and sampled quantities 406-412 ($Q_1$, $Q_2$, $Q_3$, $Q_4$) of the reflected light signal 404 can be measured using four out-of-phase time windows (e.g., sensor integration time windows) $C_1$ 414, $C_2$ 416, $C_3$ 418 and $C_4$ 420, with each window (414-420) being phase-stepped such that $C_1$ is 0 degrees, $C_2$ is 180 degrees, $C_3$ is 90 degrees, and $C_4$ is 270 degrees. As illustrated in FIG. 4, the measured quantities 406-412 correspond to the overlap regions between the measurement time windows and the reflected light signal 404.

The phase delay between the light signal 402 emitted and the reflected light signal 404, φ, and the distance, d, can then be calculated by the following equations:

$$\varphi = \text{ArcTan}\left(\frac{Q_3 - Q_4}{Q_1 - Q_2}\right) \qquad \text{Eq. 2}$$

$$d = \frac{c}{4\pi f}\varphi \qquad \text{Eq. 3}$$

In some examples, the quantities 406-412 ($Q_1$, $Q_2$, $Q_3$, $Q_4$) can be used to compute pixel intensity and offset. Moreover, in some cases, the terms ($Q_3$–$Q_4$) and ($Q_1$–$Q_2$) can reduce the effect of constant offset from the quantities (406-412). The quotient in the phase equation, equation 2, can reduce the effects of system or environmental variations from the distance measurements such as, for example, system amplification, system attenuation, the reflected intensity, etc.

Figure 5:
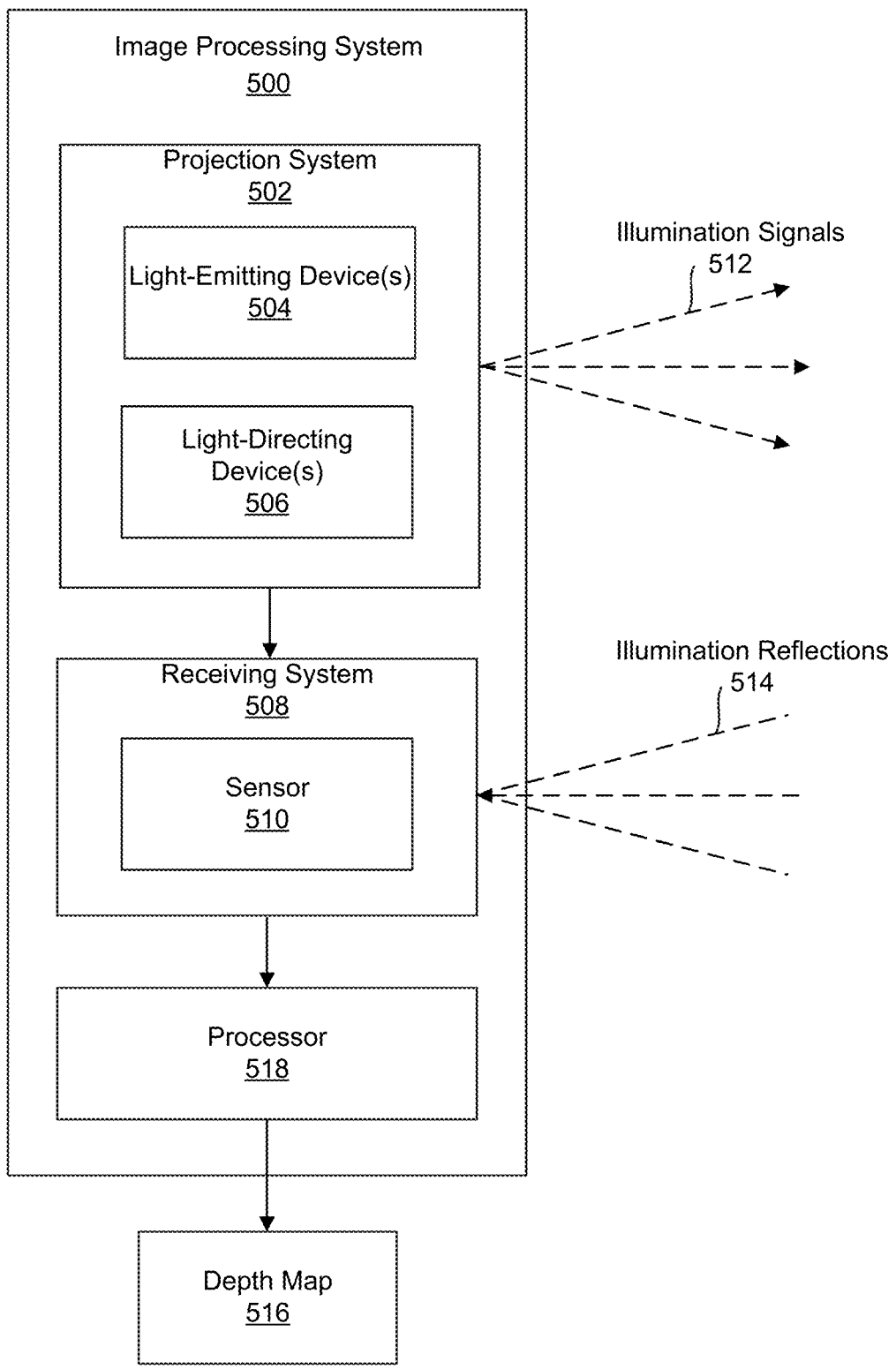
FIG. 5 is a simplified block diagram illustrating an example image processing system for ToF signal processing, in accordance with some examples of the present disclosure.

FIG. 5 is a diagram illustrating an example image processing system 500 for ToF signal processing. In some cases, the image processing system 500 can correspond to all or a portion of the image processing system 100 of FIG. 1. As shown in FIG. 5, the image processing system 500 can include a projection system 502, a receiving system 508, and a processor 518. These and/or other components of the image processing system 500 can be configured to generate a depth map 516. The depth map 516 can include depth information associated with targets (e.g., objects) within a FOV of the image processing system 500.

In some cases, the projection system 502 can include one or more light-emitting devices 504. The one or more light-emitting devices 504 can include any device configured to emit light for the purpose of obtaining depth information (e.g., distance measurements) for one or more targets. In an illustrative example, the one or more light-emitting devices 504 can include one or more vertical cavity surface emitting lasers (VCSELs) or other laser devices. For instance, the one or more light-emitting devices 504 can include a plurality of VCSELs arranged in a VCSEL array. As will be explained in greater detail below, the projection system 502 can include a single VCSEL array, or multiple VCSEL arrays. In some cases, the one or more light-emitting devices 504 can be configured to emit light with a certain wavelength (or certain range of wavelengths). In a non-limiting example, the one or more light-emitting devices 504 can be configured to emit narrowband near infrared (NIR) light (e.g., light with a wavelength between 800 and 2500 nanometers). The one or more light-emitting devices 504 can emit light with any wavelength suitable for obtaining ToF data.

As shown, the projection system 502 can include one or more light-directing devices 506. The one or more light-directing devices 506 can include any device configured to change, adjust, or otherwise direct the angle of light emitted by the one or more light-emitting devices 504. In one example, the one or more light-directing devices 506 can include one or more projection lenses that disperse light by means of refraction. In another example, the light-directing devices 506 can include one or more mirrors that reflect light at a desired angle based on the law of mirror reflection. As will be explained in more detail below, the one or more light-directing devices 506 can be configured to selectively direct light emitted by the one or more light-emitting devices 504 to particular portions of the FOV of the image processing system 500.

In some cases, the projection system 502 can generate and project illumination signals 512. The illumination signals 512 can correspond to light emitted by the one or more light-emitting devices 504 and directed by the one or more light-directing devices 506. In one example, the illumination signals 512 can include a plurality of illumination signals emitted at different points in time. For instance, the illumination signals 512 can include a series of illumination signals that are sequentially directed to different FOV portions of the image processing system 500. The illumination signals 512 can be absorbed, transmitted, and/or reflected by one or more targets. All or a portion of the illumination signals that are reflected can be captured by the receiving system 508. The reflected and captured illumination signals can correspond to illumination reflections 514 in FIG. 5. In one example, the illumination reflections 514 can be received by a sensor 510 of the receiving system 508. The sensor 510 can include any type or form of device configured to receive, capture, and/or process light having the wavelength of the light emitted by the one or more light-emitting devices 504. In one example, the sensor 510 can include a spectrum bandpass filter that filters all or a portion (e.g., most) of the ambient interference while passing light having a wavelength approximately the same as (e.g., within certain tolerance of) the illumination signals 512. In some cases, the sensor 510 can include a ToF sensor. For example, the sensor 510 can correspond to all or a portion of the ToF system 102 and/or the image sensor 104 of the image processing system 100. The sensor 510 can process the illumination reflections 514 to determine distance information associated with one or more targets. For example, the sensor 510 can determine the distance to a target based on an amount of time between projection of an illumination signal and receipt of a corresponding illumination reflection (in accordance with the direct ToF technique described above). In another example, the sensor 510 can determine the distance to a target based on a phase shift between an illumination signal and a corresponding illumination reflection (in accordance with the indirect ToF technique described above). In some cases, the resolution (e.g., image resolution) of the sensor 510 corresponds to the number of pixels (e.g., photo-sensitive elements) within the sensor 510. All or a portion of the pixels of the sensor 510 can receive an illumination reflection in response to a projected illumination signal. In one example, the sensor 510 can determine a distance measurement corresponding to each pixel of the sensor 510.

In some examples, the processor 518 can generate the depth map 516 based at least in part on the distance measurements determined by the sensor 510. For example, the sensor 510 and/or the processor 518 can combine distance measurements associated with individual FOV portions to generate a complete set of distance measurements for the entire FOV of the image processing system 500. The processor 518 can determine a depth map for the entire FOV using the complete set of distance measurements.

Figure 6A:
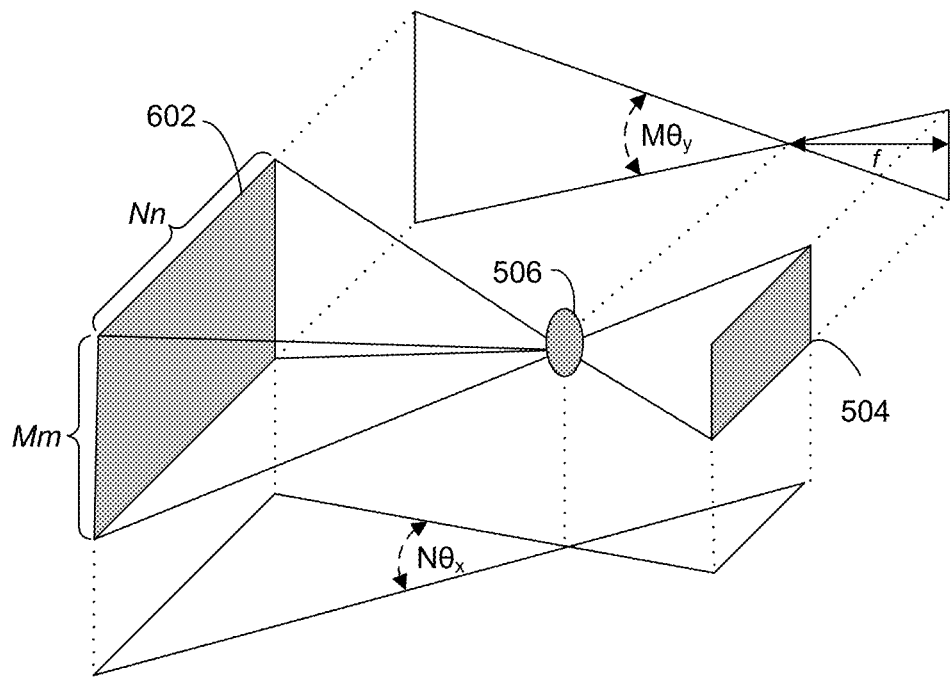
FIG. 6A is an illustration of an example field-of-view (FOV) of an image processing system for ToF signal processing, in accordance with some examples of the present disclosure.

FIG. 6A is a diagram of an example FOV 602 of the image processing system 500 of FIG. 5. In this example, the FOV 602 can correspond to the cumulative FOV of the projection system 502. For example, the FOV 602 can represent the total divergence angle of the projection system 502. As described above, the one or more light-directing devices 506 can be configured to direct the light emitted by the one or more light-emitting devices 504 at various angles (e.g., in order to reduce the divergence angle of the projection system 502 to a particular FOV portion). In one example, each FOV portion can be associated with a particular configuration of the components of the projection system 502. Thus, the FOV 602 can represent a combination of the FOVs resulting from each possible projection configuration of the projection system 502.

Figure 6B:
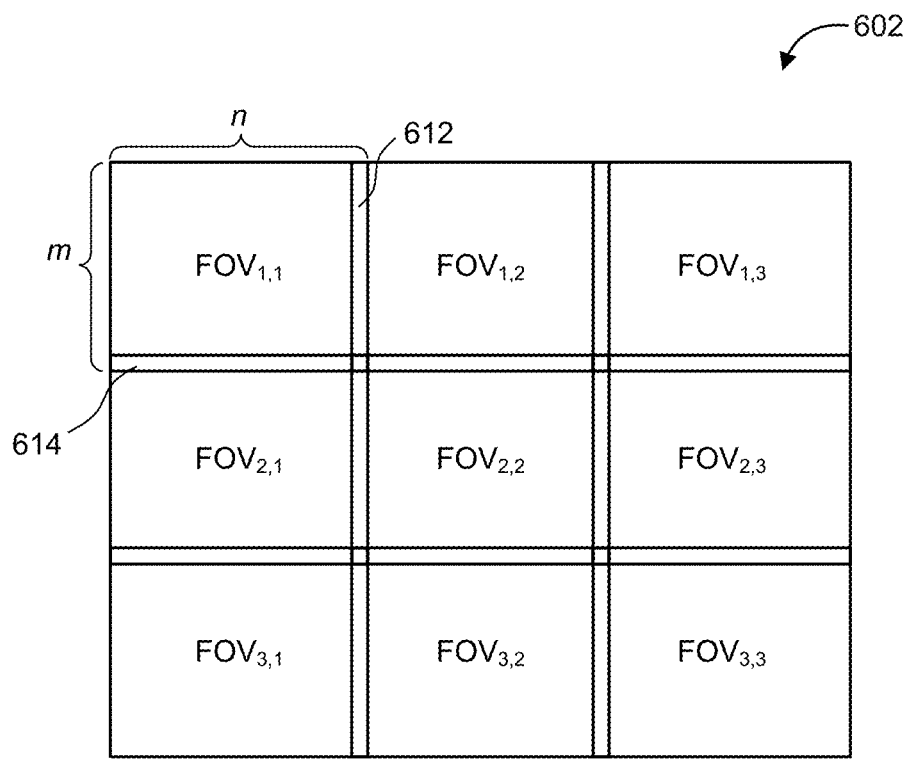
FIG. 6B is a diagram of example portions of an FOV of an image processing system, in accordance with some examples of the present disclosure.

FIG. 6B is a diagram of example FOV portions of the FOV 602. In this example, the FOV 602 can include 9 FOV portions. In some cases, the resolution (e.g., image resolution) of ToF data associated with each FOV portion can correspond to the full resolution of the sensor 510. For example, the scene of each FOV portion is imaged sequentially on the entire sensor 510. In this way, the full resolution of the sensor 510 can be utilized at each configuration. Further, the full illumination power of the projection system 502 can be utilized at each configuration. As will be explained in more detail below, the image processing system 500 can combine ToF data associated with multiple FOV portions to generate a depth map that has a resolution greater than the resolution of the sensor 510. For example, the resolution of the depth map 516 can correspond to the resolution of the sensor 510 multiplied by the number of FOV portions into which the FOV 602 is divided. In an illustrative example, the resolution of the sensor 510 can be given as r=n×m and the FOV 602 can be divided into N×M FOV portions. In this example, the resolution of a cumulative depth map corresponding to the entire FOV can be given as R=Nn×Mm. Further, if one FOV portion corresponds to a horizontal projection angle $\theta_x$ and a vertical projection angle $\theta_y$, the horizontal and vertical projection angles of the FOV 602 can be given as $\theta_x$=$N\theta_x$ and $\theta_y$=$M\theta_y$, respectively. See FIG. 6A and FIG. 6B for reference.

In some cases, the projection system 502 can sequentially illuminate each FOV portion of the FOV 602. For example, the projection system 502 can illuminate a first FOV portion by projecting a first illumination signal while in a first projection configuration. The receiving system 508 can capture and process the first illumination reflection with the entire sensor 510 resolution, and the full resolution ToF frame of the first illumination is stored in the memory buffer. After the first illumination reflection is received and/or processed, the projection system 502 can illuminate a second FOV portion by projecting a second illumination signal while in a second projection configuration. The receiving system 508 can capture and process the second illumination reflection with the entire sensor 510 resolution, and the full resolution ToF frame of the second illumination is also stored in the memory buffer. In some examples, the image processing system 500 can repeat the process of projecting illumination signals and receiving illumination reflections until an illumination reflection corresponding to each FOV portion has been received. During this process, a single FOV portion can be illuminated at a time. For instance, the projection system 502 can be configured to stop projecting light towards one FOV portion before projecting light towards another FOV portion.

In one example, the projection system 502 can illuminate FOV portions in accordance with a sequential illumination order. The sequential illumination order can correspond to a predetermined order in which the projection system 502 "scans" the FOV portions. A sequential illumination order can include scanning through rows of FOV portions, scanning through columns of FOV portions, scanning diagonally across FOV portions, among other illumination orders. In an illustrative example, a sequential illumination order for illuminating the FOV portions shown in FIG. 6B can follow the sequence of ToF frames $FOV_{1,1}$, $FOV_{1,2}$, $FOV_{1,3}$, $FOV_{2,1}$, etc. In some cases, the receiving system 508 can receive illumination reflections in a sequential receiving order that corresponds to the sequential illumination order. For example, the sensor 510 can determine distance measurements in response to each illumination reflection received by the sensor 510. The sensor 510 can record particular distance measurements in association with appropriate FOV portions based on the sequential illumination order. For example, the image processing system 500 can send a synchronization signal to the projection system 502 and the receiving system 508. The synchronization signal can indicate, to both the projection system 502 and the receiving system 508, the FOV currently being illuminated.

As mentioned above, the image processing system 500 can combine (e.g., "stitch together") distance measurements associated with individual FOV portions to generate a complete set of distance measurements for the entire FOV. To combine distance measurements associated with individual FOV portions, the image processing system 500 can store ToF frames for each FOV portion (e.g., ToF frames $FOV_{1,1}$, $FOV_{1,2}$, $FOV_{1,3}$, $FOV_{2,1}$, through $FOV_{3,3}$ for the FOV portions of FIG. 6B). In one example, the image processing system 500 can store the ToF frames in a built-in memory buffer of the sensor 510. In another example, the image processing system 500 can store the ToF frames in a system memory external to the sensor 510 (e.g., the storage 106 of the image processing system 100). In some cases, the image processing system 500 can combine distance measurements associated with FOV portions in real-time. For example, the sensor 510 and/or the processor 518 can incorporate distance measurements into the complete set of distance measurements as new illumination reflections are received and processed in accordance with the sequential illumination order. In other examples, the sensor 510 and/or the processor 518 can generate the complete set of distance measurements after each FOV portion has been scanned. The complete set of distance measurements can be stored in a single location (e.g., the same file or data structure), and used for generating the depth map 516. The image stitching operation can be implemented by the sensor electronics of the image processing system 500 or outside of the sensor electronics (e.g., by the device CPU or other processor).

In some examples, one FOV portion can partially overlap another FOV portion. For example, FIG. 6B illustrates an example overlap 612 between $FOV_{1,1}$ and $FOV_{1,2}$. In one example, the overlap 612 can correspond to an overlap of a predetermined number of pixels. For instance, the horizontal resolution n of $FOV_{1,1}$ can be given by $n=n_x+x$, where $n_x$ corresponds to pixels unique to $FOV_{1,1}$ and x corresponds to pixels included in both $FOV_{1,1}$ and $FOV_{1,2}$. Similarly, $FOV_{1,1}$ and $FOV_{2,1}$ can share an overlap 614. In one example, the vertical resolution m of $FOV_{1,1}$ can be given by $m=m_y+y$, where $m_y$ corresponds to pixels unique to $FOV_{1,1}$ and y corresponds to pixels included in both $FOV_{1,1}$ and $FOV_{2,1}$. As shown in FIG. 6B, all or a portion of the remaining FOV portions can include similar overlaps. In some cases, overlaps between FOV portions can facilitate implementing an image stich scheme that seamlessly "stitches" the FOV portions together using an automated digital alignment technique. For example, the image processing system 500 can localize pixels within FOV portions relative to the entire FOV based at least in part on detecting overlapping (e.g., matching) distance measurements. The image processing system 500 can implement overlaps of any suitable size, including no overlap.

Figure 7:
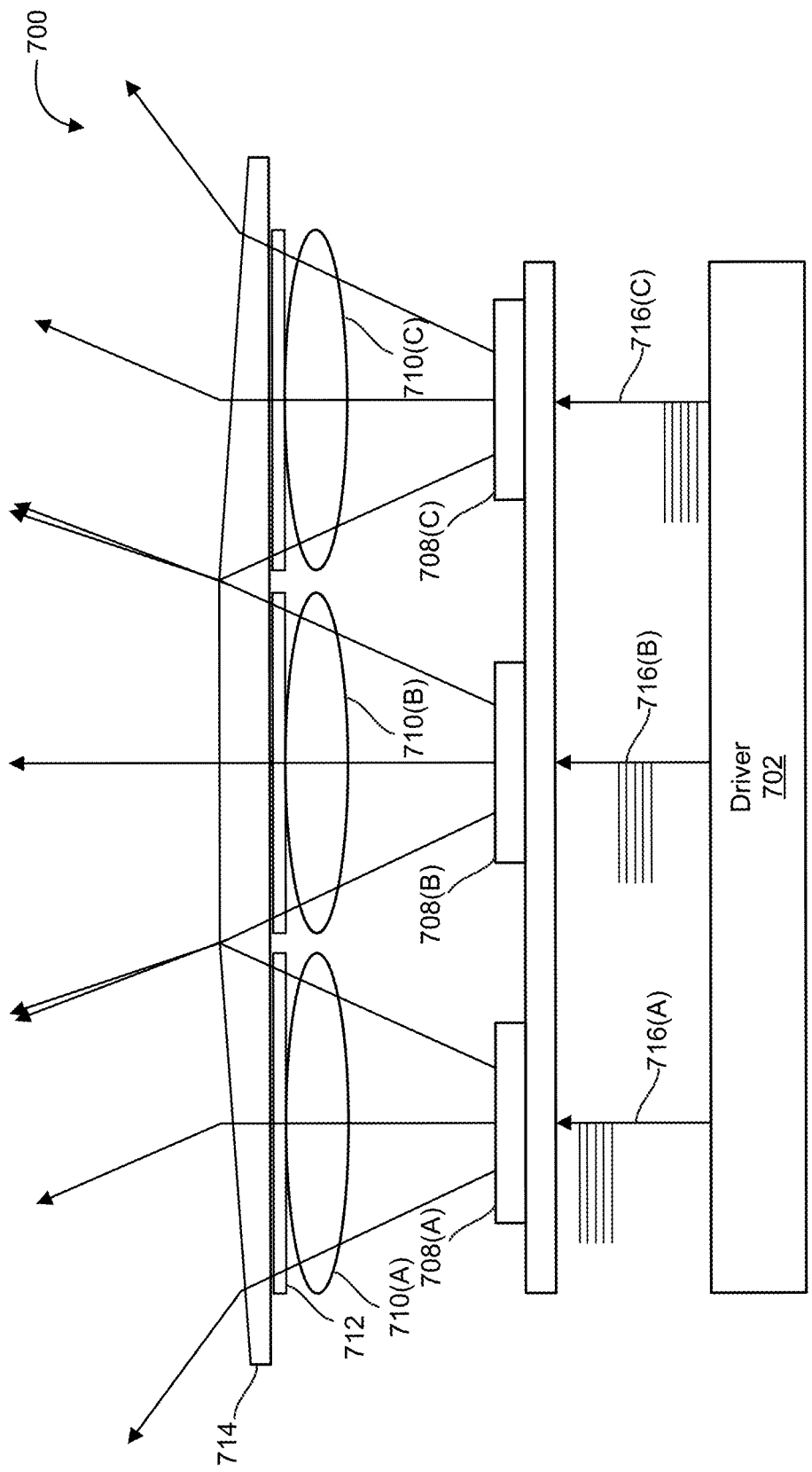
FIG. 7 is a diagram of an example device for illuminating portions of an FOV of an image processing system, in accordance with some examples of the present disclosure.

FIG. 7 is a diagram of a device 700 corresponding to an example implementation of the projection system 502 of FIG. 5. In some examples, the device 700 can include multiple light-emitting devices. In an illustrative example, the device 700 can have a plurality of VCSEL arrays. As shown, the device 700 can include one or more light-emitting devices, including light-emitting devices 708(A), 708(B), and 708(C). Although FIG. 7 illustrates three light-emitting devices 708(A), 708(B), and 708(C), the device 700 can include any suitable number of light-emitting devices arranged in any suitable configuration. In an illustrative example, the device 700 can include nine light-emitting devices arranged in a 3×3 grid. In some cases, the number of light-emitting devices of device 700 can correspond to the number of FOV portions into which the FOV 602 is divided. In these cases, each light-emitting device can correspond to a different FOV portion. For example, the projection system 502 can sequentially activate (e.g., turn on) each light-emitting device in turn in order to scan each FOV portion.

In some cases, the device 700 can include one or more projection lenses and/or additional light-directing components configured to project the light emitted by the light-emitting devices. For example, the device 700 can include a plurality of projection lenses (e.g., a projection lens array including projection lenses 710(A), 710(B), and/or 710(C)). In some cases, each projection lens of the projection lens array can correspond to one of the light-emitting devices (e.g., light from the light-emitting device 708(A) is emitted through a corresponding projection lens 710(A) of the plurality of projection lenses, light from the light-emitting device 708(B) is emitted through a corresponding projection lens 710(B), and so on). In an illustrative example, the projection lens array can include a plurality of discrete (e.g., separated) projection lenses. In some examples, the device 700 does not include a projection lens array (i.e., the projection lens array can be optional). In some cases, the focal length of the projection lenses 710(A), 710(B), and 710(C) of the projection lens array determines the degrees of each of the FOV portions, e.g., $FOV_{1,1}$, $FOV_{1,2}$, ... $FOV_{n,m}$, .... In some cases, the focal length of the projection lenses 710(A), 710(B), and 710(C) together with the light directing element (e.g., the prism 714) determines the amount of overlapping between the FOV portions.

In some cases, a prism 714 shown in FIG. 7 can be configured to direct light at different angles (or a different range of angles). In some examples, each projection lens of the projection lens array, together with the prism 714, can be configured to direct light at a particular angle. For example, when one light-emitting device 708(A), 708(B), or 708(C) is activated, the prism 714 (or a projection lens-prism assembly corresponding to a particular light-emitting device) can bend light from a light-emitting device (e.g., light-emitting device 708(A), 708(B), or 708(C)) towards a desired FOV portion. In one example, the prism 714 can be a segmented prism array that includes multiple prism segments configured to refract light in different directions. For example, each prism on the segmented prism array can bend light from a corresponding light-emitting device to a desired angle associated with a particular FOV portion. While a prism 714 is shown in FIG. 7, another type of optical element can be used other than a prism, such as a diffractive optical element (DOE). The direction in which a prism segment (or other optical element) refracts light can depend on the refractive index of the prism segment, the apex angle of the prism segment (e.g., the angle between two faces of the prism segment), among other characteristics. In some cases, the characteristics of a prism segment corresponding to a light-emitting device (e.g., the prism segment positioned above the light-emitting device) can be selected such that the prism segment bends light emitted by the light-emitting device towards a desired FOV portion.

In some examples, the device 700 can include a plurality of diffusers (e.g., a diffuser array 712). Each diffuser of the diffuser array 712 can correspond to (e.g., be positioned above) a respective projection lens of the projection lens array (e.g., a first diffuser above projection lens 710(A), a second diffuser above projection lens 710(B), and a third diffuser above projection lens 710(C)). In some cases, the diffuser array 712 (e.g., together with the projection lens array) can diffuse the light emitting from the pixelated VCSEL (or other type of light source) and increase the uniformity of illumination projections generated by the device 700. In some cases, the diffusers 712 can be placed on the other side of the projection lenses 710(A), 710(B), and 710(C) of the projection lens array, on top of the VCSEL array 708, or in any other suitable configuration. The device 700 can include any additional or alternative light-directing devices not illustrated in FIG. 7.

Figure 8:
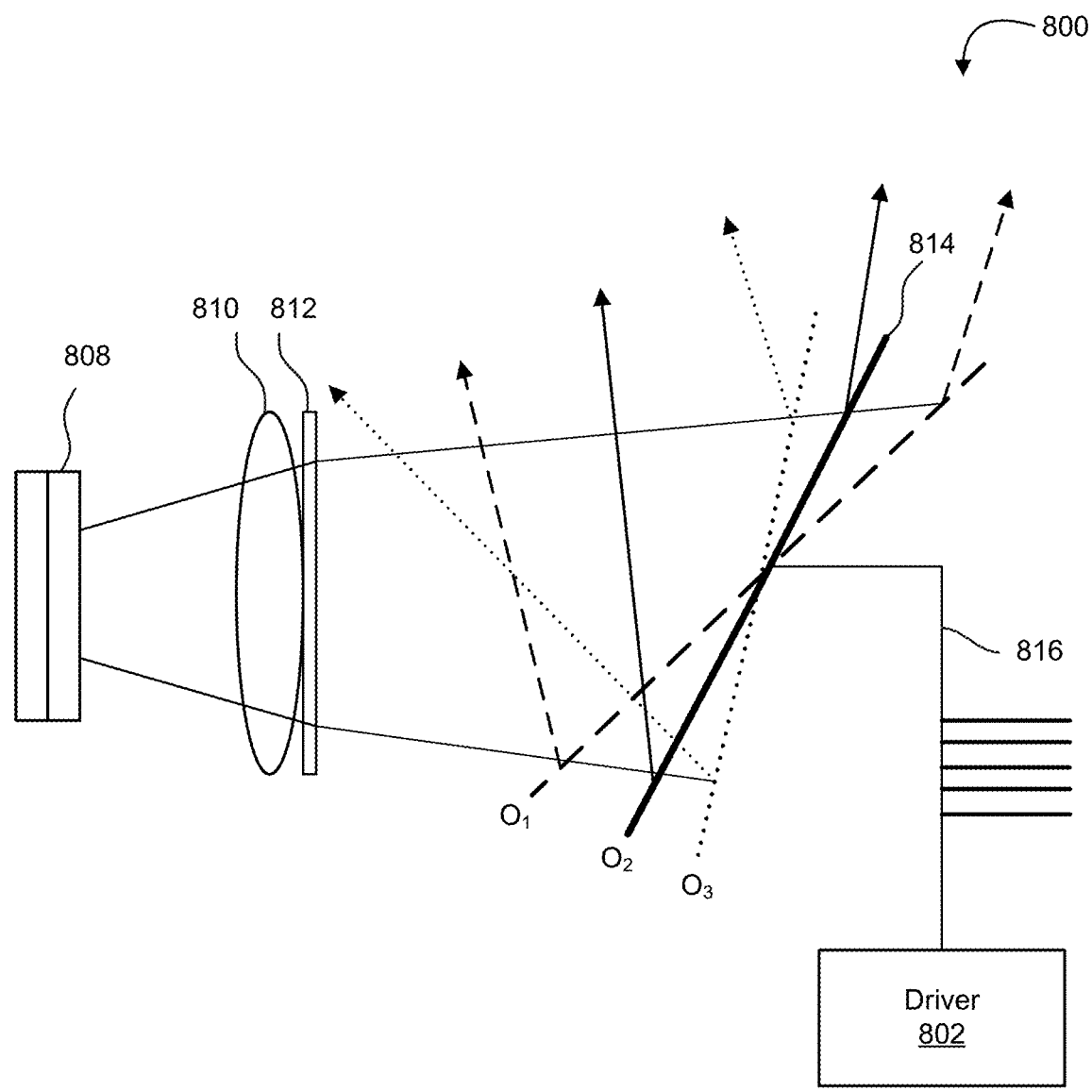
FIG. 8 is a diagram of another example device for illuminating portions of an FOV of an image processing system, in accordance with some examples of the present disclosure.

FIG. 8 is a diagram of a device 800 corresponding to another example implementation of the projection system 502 of FIG. 5. In some examples, the device 800 can include a single light-emitting device 808. In an illustrative example, the light-emitting device 808 can be a single VCSEL array. The single light-emitting device 808 can be used to sequentially illuminate each FOV portion into which a full FOV is divided. In some cases, the light emitted by the light-emitting device 808 can be directed by a scanning mirror 814. In an illustrative example, the scanning mirror 814 can be a micro electro mechanism system (MEMS) mirror. A MEMS mirror scanner can provide various benefits, including high reliability, a long lifetime, a compact size, low cost, among other benefits. The scanning mirror 814 can include and/or correspond to any additional or alternative type of scanning mirror.

In some cases, the device 800 can adjust the orientation of the scanning mirror 814 in order to adjust the direction of the emitted light. For example, the scanning mirror 814 can have a plurality of orientations. Each orientation can correspond to an illumination of a different FOV portion. In some cases, a particular orientation of the scanning mirror 814 can correspond to a particular angle between the scanning mirror 814 and a reference plane. In one example, the reference plane can be one plane (e.g., one face) of the light-emitting device 808. FIG. 8 illustrates three example orientations of the scanning mirror 814. An orientation $O_1$ of the scanning mirror 814 is illustrated in FIG. 8 with a dashed line. The direction of light projected by the scanning mirror 814 at orientation $O_1$ is illustrated with corresponding dashed arrows. Orientations $O_2$ and $O_3$ (and their corresponding directions of projected light) are illustrated with solid and dotted lines, respectively.

The device 800 can include one or more additional light-directing devices, such as a projection lens 810 and/or a diffuser 812. In some cases, the diffuser 812 (e.g., together with the lens 810 in some cases) can increase the uniformity of illumination projections generated by the device 800. In some cases, the diffuser 812 can be placed on the other side of the projection lens 810 or on top of the light emitting device 808 (e.g., a VCSEL array). The focal length of the projection lens 810 determines the degrees of each of the FOV portions, e.g., $FOV_{1,1}$, $FOV_{1,2}$, ... $FOV_{n,m}$, .... In some cases, the focal length of the projection lens 810 together with the angles of the light directing mirror 814 determines the amount of overlapping between the FOV portions. The device 800 can include any additional or alternative light-directing devices not illustrated in FIG. 8. In some examples, the device 800 does not include a projection lens 810 (i.e., the projection lens 810 can be optional).

Figure 9A:
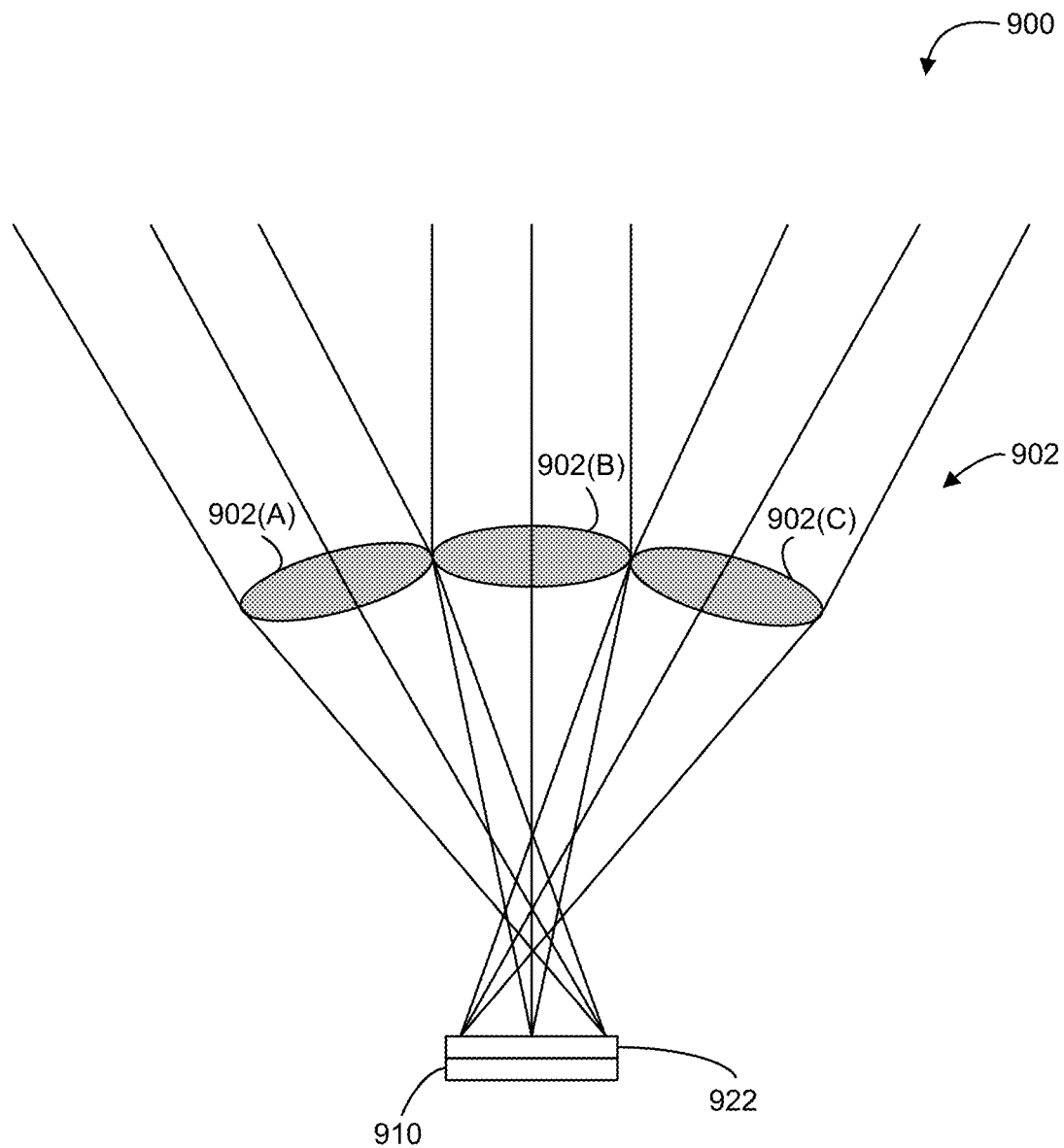
FIG. 9A is a diagram of an example device for receiving illumination reflections of portions of an FOV of an image processing system, in accordance with some examples of the present disclosure.

FIG. 9A is a diagram of a device 900 corresponding to an example implementation of the receiving system 508 of FIG. 5. In some examples, the device 900 can include a sensor 910 (e.g., corresponding to the sensor 510 of FIG. 5). The device 900 can also include one or more components configured to focus illumination reflections (e.g., illumination reflections 514 based on illumination signals 512 emitted by the projection system 502 of FIG. 5, the device 700 of FIG. 7, or the device 800 of FIG. 8) onto the sensor 910. For instance, the device 900 can include an image lens array 902 that includes one or more image lenses (e.g., image lenses 902(A), 902(B), and/or 902(C)). In an illustrative example, the image lens array 902 can include a 3×3 matrix of image lenses. In some cases, the refractive characteristics (e.g., refractive indices, angles, slopes, curvatures, tilts, etc.) of the image lens array 902 can be selected to focus an illumination reflection corresponding to one FOV portion onto the sensor 910. Further, the sensor 910 can be positioned at a distance from the image lens array 902 (or other image lens array not shown in FIG. 9) that facilitates capture of an illumination reflection. For example, the sensor 910 can be positioned within the back focal plane of the image lens array 902. In one illustrative example, the image lens array 902 can have a focal length f. The sensor 910 can be positioned at a distance f from the image lens array 902 to facilitate and/or ensure that the scene illuminated by the projector of FIG. 7 or FIG. 8 is focused or imaged on the sensor 910. Further, in some cases, the sensor 910 can be centered relative to the middle and/or center lens segment of the image lens array 902. In these cases, the center-to-center distance between the image lens segments can be designed to facilitate illuminating FOV portions of particular sizes (e.g., particular projection angles) and/or to facilitate focus of illumination reflections. For example, the locations of the image lenses 902(A), 902(B), and/or 902(C) can be designed to facilitate a desired level of light-dispersal and/or light-focusing. Each image lens of the image lens array 902 (the image lenses 902(A), 902(B), and 902(C)) is designated to image the portion of the FOV, i.e., $FOV_{1,1}$, $FOV_{1,2}$, $FOV_{n,m}$, ... to the sensor 910. In some cases, the number of the image lenses is the same as the number of FOV portions.

In some examples, the image lens array 902 can be configured for off-axis imaging. For example, in an off-axis imaging configuration, the optical axis of an image lens is not aligned with the center of the sensor. In some cases, such off-axis imaging can result in aberrations (e.g., undesirable dispersal of light). To correct and/or account for aberrations associated with off-axis imaging, one or more image lenses within the image lens array 902 can be tilted relative to each other, as illustrated in FIG. 9A. For example, the sensor 910 may be aligned with (e.g., positioned directly below) the center image lens 902(B) of the image lens array 902 and the other image lenses of the image lens array 902 (e.g., the image lenses 902(A) and 902(C)) may be misaligned relative to the sensor 910).

In some cases, the device 900 can include one or more filters that facilitate capture of illumination reflections. For instance, the device 900 can include a bandpass filter configured to pass light with a frequency corresponding to the frequency of light emitted by one or more light-emitting devices (e.g., the light-emitting devices of the device 700 of FIG. 7 and/or the device 800 of FIG. 8). In an illustrative example, the device 900 can include a narrow bandpass filter with a center frequency corresponding to NIR light. The bandpass filter can pass light corresponding to illumination reflections while at least partially blocking light interference from external light sources, e.g., sunlight, thereby increasing the signal-to-noise or signal-to-background noise ratio, and consequently, increasing the accuracy and/or quality of generated depth maps. FIG. 9A illustrates an example filter 922 that can be implemented within the device 900. As shown, the filter 922 can be positioned above the sensor 910.

Figure 9B:
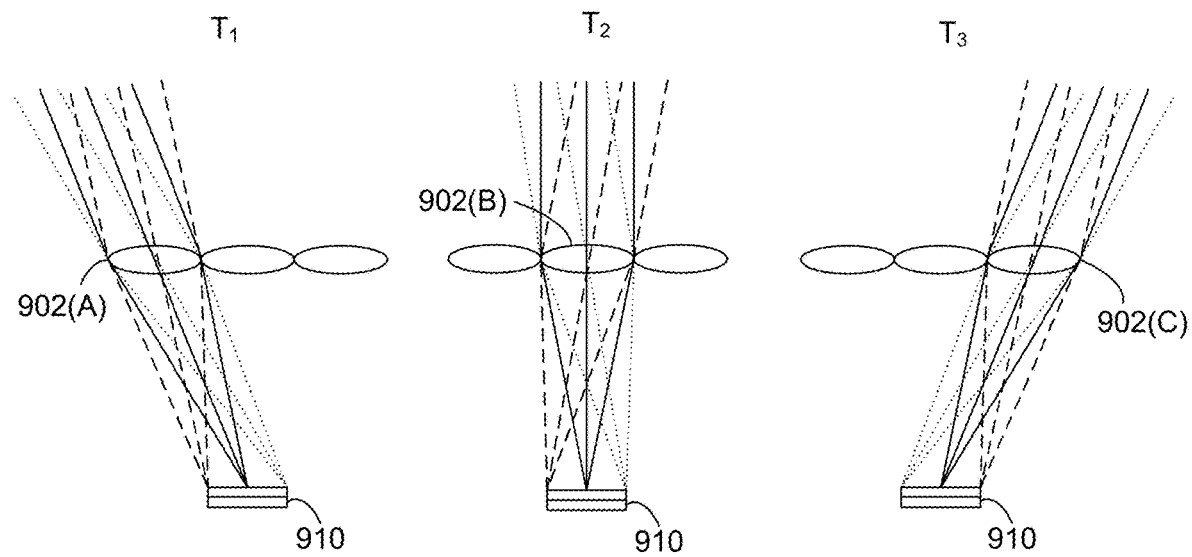
FIG. 9B and FIG. 9C are diagrams illustrating example sequential ToF image capturing processes, in accordance with some examples of the present disclosure.
Figure 9C:
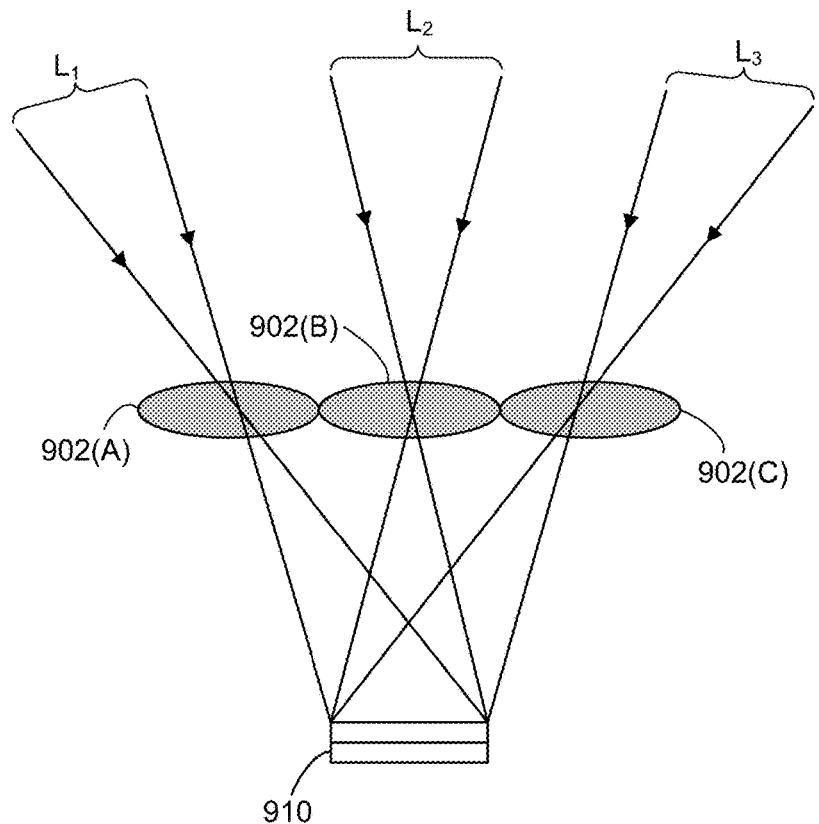

Together with a light projection system (e.g., the projection system 502 of FIG. 5, which can include the device 700 of FIG. 7 and/or the device 800 of FIG. 8), the device 900 can perform a sequential ToF image capturing process. FIG. 9B and FIG. 9C illustrate example sequential ToF image capturing processes that can be performed by the device 900 and the devices 700 and/or 800. The following description provides an example of a sequential ToF image capturing process performed by the device 900 and the device 700. At a time $T_1$, the device 700 can activate the light-emitting device 708(A), causing light to be directed towards a first FOV portion by the prism 714 and/or the corresponding projection lens 710(A) of the projection lens array. In response (e.g., at a time synchronized with time $T_1$), the sensor 910 can receive light corresponding to an illumination reflection of the first FOV portion (e.g., a FOV portion corresponding to the ToF frame $FOV_{1,1}$ of FIG. 6B). This light is illustrated as light $L_1$ in FIG. 9C. As shown in FIG. 9B and FIG. 9C, the received light $L_1$ can be directed to the sensor 910 by the image lens 902(A) and/or by an additional light-directing components of the device 900. At a time $T_2$, the device 700 can activate the light-emitting device 708(B), causing light to be directed towards a second FOV portion by the prism 714 and/or the corresponding projection lens 710(B). In response (e.g., at a time synchronized with time $T_2$), the sensor 910 can receive light corresponding to an illumination reflection of the second FOV portion (e.g., a FOV portion corresponding to the ToF frame $FOV_{1,2}$ of FIG. 6B). This light is illustrated as light $L_2$ in FIG. 9C. The received light $L_2$ can be directed to the sensor 910 by the image lens 902(B) and/or by an additional light-directing components of the device 900. At a time $T_3$, the device 700 can activate the light-emitting device 708(C), causing light to be directed towards a third FOV portion by the prism 714 and/or the corresponding projection lens 710(C). In response (e.g., at a time synchronized with time $T_3$), the sensor 910 can receive light corresponding to an illumination reflection of the third FOV portion (e.g., a FOV portion corresponding to the ToF frame $FOV_{1,3}$ of FIG. 6B). This light is illustrated as light $L_3$ in FIG. 9C. The received light $L_3$ can be directed to the sensor 910 by the image lens 902(C) and/or by an additional light-directing components of the device 900.

In some cases, the amount of time between time $T_1$ and time $T_2$ (and between time $T_2$ and time $T_3$) can be sufficient for the device 700 to project an illumination signal to one FOV, the device 900 to receive an illumination reflection corresponding to the illumination signal, and the device 900 (and/or an additional processor or computing device) to process the illumination reflection for incorporation into a depth map. In some examples, the sequential ToF illumination process can be directed at least in part by a driver 702 (shown in FIG. 7) connected to the device 700. For example, the driver 702 can send control signals 716(A), 716(B), and 716(C) to the light-emitting devices 708(A), 708(B), and 708(C), respectively. The control signals can direct a single light-emitting device to be active at a time. For instance, the control signals can stagger activation of the light-emitting devices.

The following description provides an example of a sequential ToF image capturing process performed by the device 800 and the device 900. At a time $T_1$, the device 800 can orient the scanning mirror 814 at orientation $O_1$, causing light to be directed towards a first FOV portion. In response (e.g., at a time synchronized with time $T_1$), the sensor 910 can receive light corresponding to an illumination reflection of the first FOV portion (e.g., a FOV portion corresponding to the ToF frame $FOV_{1,1}$ of FIG. 6B). At a time $T_2$, the device 800 can orient the scanning mirror 814 at orientation $O_2$, causing light to be directed towards a second FOV portion. In response (e.g., at a time synchronized with time $T_2$), the sensor 910 can receive light corresponding to an illumination reflection of the second FOV portion (e.g., a FOV portion corresponding to the ToF frame $FOV_{1,2}$ of FIG. 6B). At a time $T_3$, the device 800 can orient that scanning mirror at orientation $O_3$, causing light to be directed towards a third FOV portion. In response (e.g., at a time synchronized with time $T_3$), the sensor 910 can receive light corresponding to an illumination reflection of the third FOV portion (e.g., a FOV portion corresponding to the ToF frame $FOV_{1,3}$ of FIG. 6B). In some cases, the amount of time between time $T_1$ and time $T_2$ (and between time $T_2$ and time $T_3$) can be sufficient for the device 800 to project an illumination signal to one FOV, the device 900 to receive an illumination reflection corresponding to the illumination signal, and the device 900 (and/or an additional processor or computing device) to process the illumination reflection for incorporation into a depth map. In some examples, the sequential illumination process can be directed at least in part by a driver 802 communicatively connected to the device 800. For example, the driver 802 can send a control signal 816 to the scanning mirror 814. The control signal 816 can direct the scanning mirror 814 to adjust the orientation of the scanning mirror 814 at appropriate times in order to scan each FOV portion.

In some cases, the device 700 can facilitate sequentially obtaining distance measurements for a plurality of FOV portions without mechanical movement. For example, the device 700 can illuminate a desired FOV portion via selective activation of a light-emitting device, rather than by adjusting the physical position and/or orientation of the components of the device 700. Eliminating the need for mechanical movement can reduce the risk of failures within the device 700. As described above, the device 800 can obtain distance measurements for a plurality of FOV portions via mechanical adjustment of a scanning mirror. However, the mechanical fatigue (and corresponding performance degradation) caused by the mechanical adjustment of the scanning mirror may be negligible. Further, the device 800 can include a single light-emitting device, which can reduce the size, cost, and/or complexity of the device.

Returning to FIG. 5, as mentioned above, the image processing system 500 can synchronize the projection system 502 and the receiving system 508 via a synchronization signal. For example, the image processing system 500 can implement a synchronization scheme that includes sending a first control signal to the projection system 502 and sending a second control signal to the receiving system 508. In one example, the first control signal can indicate a sequential illumination order and the second control signal can indicate a corresponding sequential receiving order. In some cases, the first control signal and the second control signal can be the same (or a similar) time-synchronized signal.

Figure 10A:
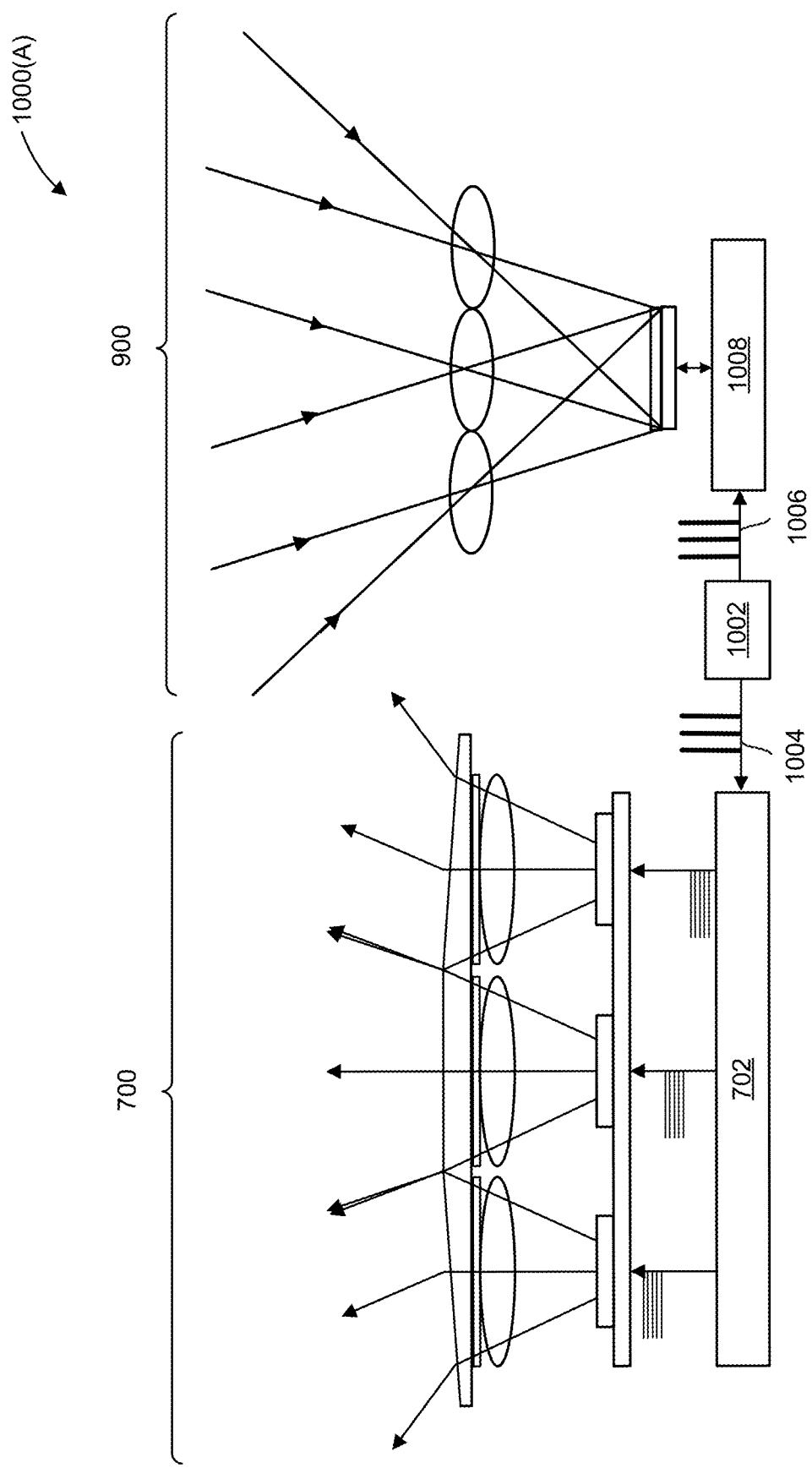
FIG. 10A and FIG. 10B are diagrams of example systems for synchronized ToF sensing, in accordance with some examples of the present disclosure.

FIG. 10A is a diagram of an example synchronized ToF system 1000(A). In one example, all or a portion of the synchronized ToF system 1000(A) can correspond to the device 700 of FIG. 7 and the device 900 of FIG. 9A. As shown, the synchronized ToF system 1000(A) can include a controller 1002. The controller 1002 can send a control signal 1004 to a driver of the device 700 (e.g., the driver 702). In some cases, the control signal 1004 can represent a VCSEL-select signal. For example, the control signal 1004 can direct the driver 702 to selectively activate the light-emitting devices 708 of the device 700 at appropriate times. In one example, the control signal 1004 can direct the driver 702 to send the control signals 716(A), 716(B), and/or 716(C) shown in FIG. 7. In some cases, the control signals 716(A), 716(B), and/or 716(C) can include a driving current (e.g., a pulse train drive current or a continuous wave (CW) modulated drive current) suitable for operation of the light-emitting devices 708. The controller 1002 can also send a control signal 1006 to sensor electronics 1008 of the device 900. The sensor electronics 1008 can include hardware and/or software components configured to determine distance measurements associated with illumination reflections. In some cases, the control signal 1006 can be synchronized with the control signal 1004. For instance, the control signal 1006 can indicate, to the sensor electronics 1008, which FOV portion is currently being illuminated and, therefore, which FOV portion corresponds to the current illumination reflection. Based on the control signals 1004 and 1006, the synchronized ToF system 1000(A) can label distance measurements in association with corresponding FOV portions.

Figure 10B:
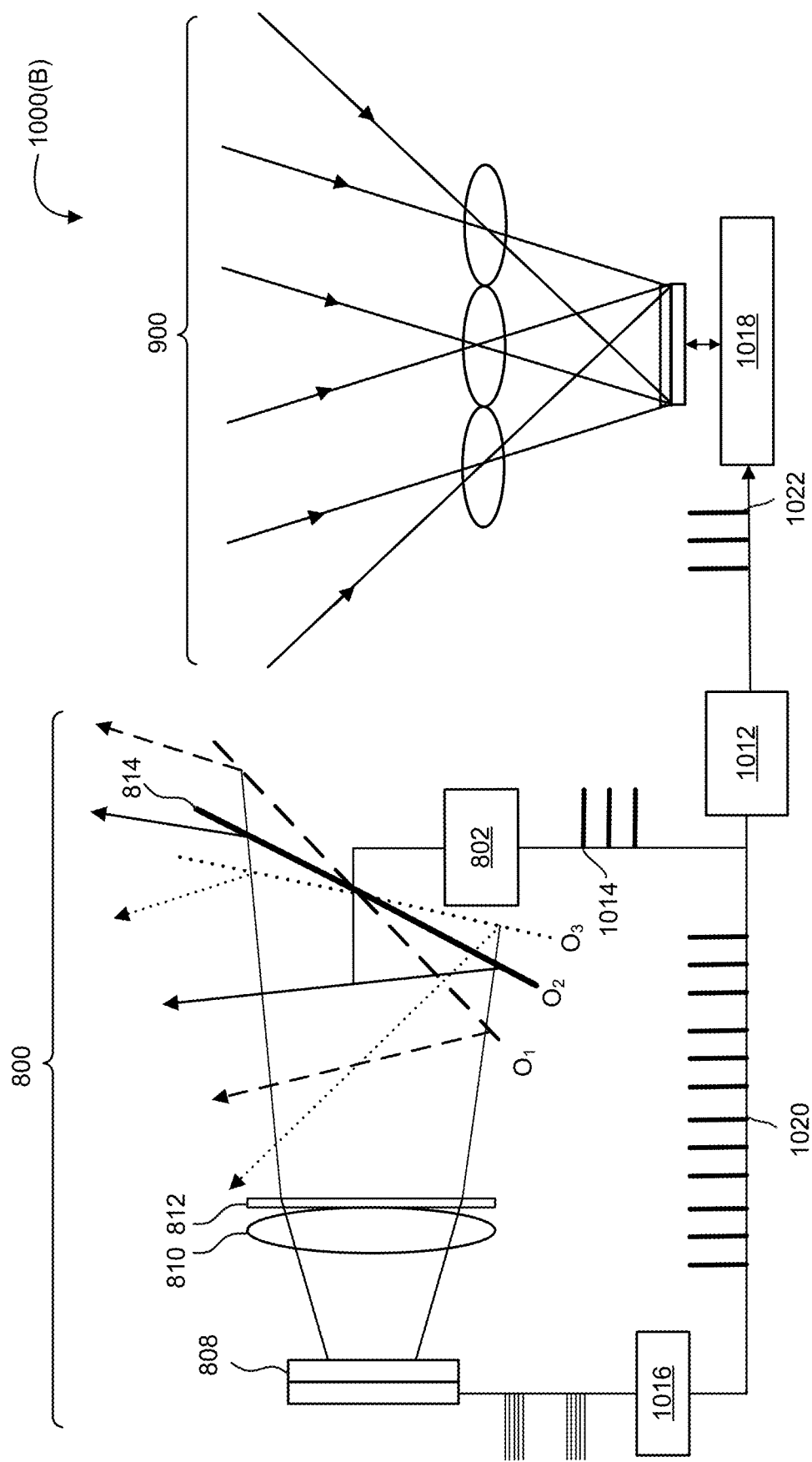

FIG. 10B is a diagram of an example synchronized ToF system 1000(B). In one example, all or a portion of the synchronized ToF system 1000(B) can correspond to the device 800 of FIG. 8 and the device 900 of FIG. 9A. As shown, the synchronized ToF system 1000(B) can include a controller 1012. The controller 1012 can send a control signal 1014 to a driver of the device 800 (e.g., the driver 802). In some cases, the control signal 1014 can represent an angle-select signal. For instance, the control signal 1014 can direct the driver 802 to adjust the angle of the scanning mirror 814 at appropriate times. In some examples, the controller 1012 can send a control signal 1020 to an additional driver 1016. In one example, the driver 1016 can be a driver for the light-emitting device 808 of the device 800. In some cases, the control signal 1020 can represent a VCSEL-synchronization signal. For example, the control signal 1020 can direct the driver 1016 to provide an appropriate driving current to the light-emitting device 808 in order to sequentially illuminate FOV portions. As shown, the controller 1012 can send a control signal 1022 to sensor electronics 1018 of the device 900. The sensor electronics 1018 can include hardware and/or software components configured to determine distance measurements associated with illumination reflections. In some cases, the control signal 1022 can be synchronized with the control signal 1014 and/or the control signal 1020. For instance, the control signal 1022 can indicate, to the sensor electronics 1018, which FOV portion is currently being illuminated and, therefore, which FOV portion corresponds to the current illumination reflection. Based on the control signals 1014, 1020, and/or 1022, the synchronized ToF system 1000(B) can label distance measurements in association with corresponding FOV portions.

Using the systems and techniques described herein, a ToF system can generate depth maps (e.g. depth image maps) having a resolution that exceeds the full resolution of a ToF sensor of the ToF system. The systems and techniques also allow the ToF system to generate high-resolution depth maps without incurring substantial delays in processing time and without increasing the size of the sensor (thus decreasing the cost of the sensor).

FIG. 11 is a flow diagram illustrating an example process 1100 for high resolution ToF depth imaging. For the sake of clarity, the process 1100 is described with references to the systems and devices of FIG. 5, FIG. 7, FIG. 8, and FIG. 9A. The steps or operations outlined herein are examples and can be implemented in any combination thereof, including combinations that exclude, add, or modify certain steps or operations.

At operation 1102, the process 1100 includes illuminating at least one portion of an FOV of a projection system including one or more light-emitting devices, wherein the entire FOV includes a plurality of FOV portions. In some examples, a first FOV portion of the plurality of FOV portions can partially overlap at least a second FOV portion of the plurality of FOV portions. In some examples, illuminating the plurality of FOV portions includes illuminating each of the plurality of FOV portions in a sequential illumination order (e.g., by illuminating a single FOV portion at a time). In such examples, receiving each illumination reflection of the plurality of illumination reflections includes receiving each reflection in a sequential receiving order that corresponds to the sequential illumination order. The process 1100 can include generating each image of the plurality of images based on each illumination reflection of the plurality of illumination reflections. Referring to FIG. 5 as an illustrative example, the projection system 502 of the image processing system 500 can illuminate each of the plurality of FOV portions in the sequential illumination order at least in part by illuminating a single FOV portion at a time. In some examples, the projection system 502 can sequentially project the illumination signals 512 using the light-emitting device(s) 504 and/or the light-directing device(s) 506.

In one illustrative example, the light-emitting device(s) 504 can include a plurality of light-emitting devices and the light-directing device(s) 506 can include a plurality of projection lenses. Each projection lens of the plurality of projection lenses can be configured to project (e.g., together with a prism, such as prism 714) light emitted by one of the plurality of light-emitting devices towards a different FOV portion of the plurality of FOV portions. In some examples, the projection system 502 can include a segmented prism array configured to direct the light to each FOV portion of the plurality of FOV portions. For instance, the plurality of light-emitting devices 504 can include the light-emitting devices 708 of FIG. 7, and the plurality of light-directing devices can include the prism 714 of FIG. 7. In one example, the prism 714 can be a segmented prism array that includes multiple prism segments. Each prism segment of the prism 714 can be positioned above one of the light-emitting devices 708. Further, each prism segment of the prism 714 can be oriented at a different angle relative to a plane of the light-emitting devices 708. In some examples, the projection system 502 can include one or more diffusers positioned relative to the scanning mirror. The one or more diffusers are configured to diffuse the light emitted by the single light-emitting device. For instance, the device 700 of FIG. 7 (as an example of the projection system 502) can include the diffuser array 712. As another example, the device 800 of FIG. 8 can include the diffuser 812.

In another illustrative example, the light-emitting devices(s) 504 can include a single light-emitting device and the light-directing device(s) 506 can include a scanning mirror. The scanning mirror can be configured to project light emitted by the single light-emitting device towards different FOV portions of the plurality of FOV portions when oriented at different orientations. For instance, the single light-emitting device can include the light-emitting device 808 of FIG. 8, and the single-light directing device can include the scanning mirror 814 of FIG. 8. The scanning mirror 814 can be a scanning mirror. In some cases, the scanning mirror 814 can be positioned above the light-emitting device 808. Further, each different orientation of the scanning mirror 814 can correspond to a different orientation angle between the scanning mirror 814 and a plane of the light-emitting device 808.

At operation 1104, the process 1100 includes sequentially capturing (e.g., by a sensor of a receiving system, such as receiving system 508) a plurality of images based on a plurality of illumination reflections corresponding to light emitted by the one or more light-emitting devices. Each image of the plurality of images corresponds to one of the plurality of FOV portions. Further, an image resolution associated with each image of the plurality of images corresponds to a full resolution of the sensor. In one illustrative example referring to FIG. 5, the receiving system 508 of the image processing system 500 can receive the illumination reflections 514 in a sequential receiving order that corresponds to the sequential illumination order of the illumination signals 512. A sensor of the receiving system 508 can capture an image for each illumination reflection. For example, the projection system 502 can illuminate a first FOV portion of the plurality of FOV portions and the receiving system 508 can receive a first illumination reflection and the sensor can capture a first image corresponding to the first FOV portion. After receiving the first illumination reflection, the projection system 502 can illuminate a second FOV portion of the plurality of FOV portions. The receiving system 508 can then receive a second illumination reflection and the sensor can capture a second image corresponding to the second FOV portion.

In one example, the projection system 502 and the receiving system 508 can be synchronized. For example, the processor 518 of the image processing system 500 can send, to the projection system 502, a first control signal directing the projection system 502 to illuminate a particular FOV portion of the plurality of FOV portions. 506. The processor 518 can also send, to the receiving system 508, a second control signal directing the receiving system 508 to associate an illumination reflection received by the sensor 510 with the particular FOV portion. The first control signal and the second control signal can be time-synchronized.

In some examples, the receiving system 508 can include an array of image lenses, with each image lens of the array being configured to project, to a sensor of the receiving system 508, light associated with a different portion of the scene corresponding to a respective FOV portion of the plurality of FOV portions. For instance, the device 900 of FIG. 9A (as an example of the receiving system 508) can include the image lens array 902. In some cases, the receiving system 508 can include a filter positioned above the sensor 510. For instance, the device 900 can include the filter 922. The filter 922 can be configured to transmit light with a frequency corresponding to a frequency of light emitted by the light-emitting device(s) 504 (e.g., the light-emitting devices 708 of FIG. 7 and/or the light-emitting device 808 of FIG. 8).

At operation 1106, the process 1100 includes generating, using the plurality of images (and/or illumination reflections), an increased resolution depth map associated with the entire FOV. For instance, the processor 518 can generate the depth map 516, which can include an increased resolution depth map based on the various full resolution images associated with each FOV portion of the entire FOV. In one example, the processor 518 can generate a plurality of partial distance measurements (e.g., as images) that each correspond to one of the illumination reflections 514. The processor 518 can then generate the depth map 516 by combining the plurality of partial distance measurements. Further, in one example, the image resolution of the depth map 516 can correspond to a maximum resolution of the sensor 510 multiplied by the number of individual FOV portions.

In some examples, the process 1100 and/or other processes described herein may be performed by one or more computing devices or apparatuses. In some examples, the process 1100 and/or other processes described herein can be performed by the image processing system 500 shown in FIG. 5, the device 700 shown in FIG. 7, the device 800 shown in FIG. 8, the device 900 shown in FIG. 9A, the synchronized ToF system 1000(A) shown in FIG. 10A, the synchronized ToF system 1000(B) shown in FIG. 10B, and/or one or more computing devices with the computing device architecture 1100 shown in FIG. 1100. In some cases, such a computing device or apparatus may include a processor, microprocessor, microcomputer, or other component of a device that is configured to carry out the steps of the process 1100. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1100 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
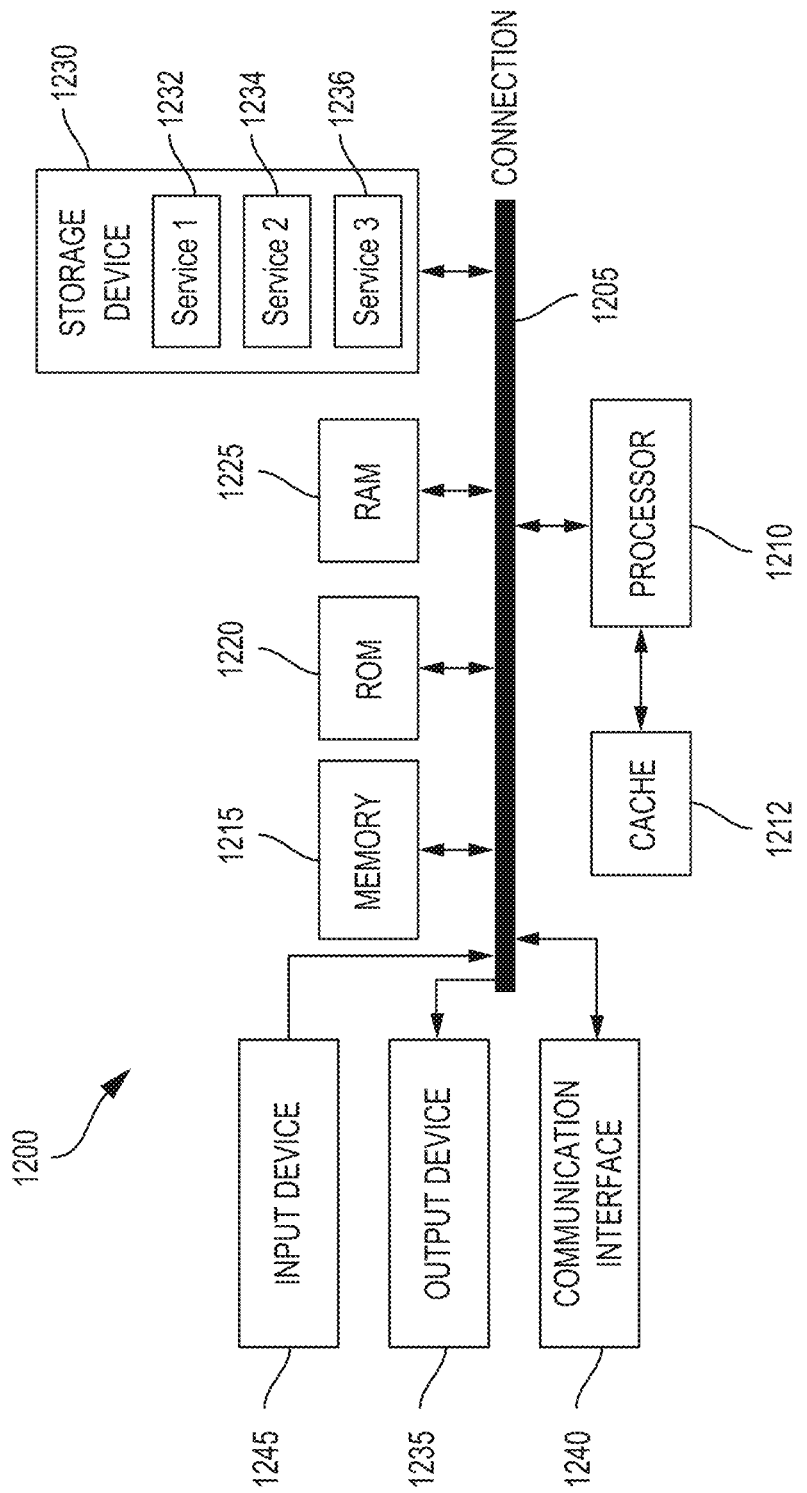
FIG. 12 is a diagram illustrating an example of a system for implementing certain aspects described herein.

FIG. 12 is a diagram illustrating an example of a system for implementing certain aspects of the present technology.

In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some examples, computing system 1200 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.12 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some examples, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1: An apparatus for high resolution time-of-flight depth imaging, the apparatus comprising: a projection system including one or more light-emitting devices, each light-emitting device of the one or more light-emitting devices configured to illuminate at least one portion of an entire field-of-view (FOV) of the projection system, wherein the entire FOV includes a plurality of FOV portions; a receiving system including a sensor configured to sequentially capture a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to a full resolution of the sensor; and a processor configured to generate, using the plurality of images, an increased resolution depth map associated with the entire FOV.

Aspect 2: The apparatus of claim 1, wherein: the projection system is configured to illuminate each of the plurality of FOV portions in a sequential illumination order, the sequential illumination order including illuminating a single FOV portion at a time; and the receiving system is configured to receive each illumination reflection of the plurality of illumination reflections in a sequential receiving order that corresponds to the sequential illumination order and to generate each image of the plurality of images based on each illumination reflection.

Aspect 3: The apparatus of claim 2, wherein, to illuminate each of the plurality of FOV portions in the sequential illumination order, the projection system is configured to: illuminate a first FOV portion of the plurality of FOV portions; receive a first illumination reflection corresponding to the first FOV portion; after receiving the first illumination reflection, illuminate a second FOV portion of the plurality of FOV portions; and receive a second illumination reflection corresponding to the second FOV portion.

Aspect 4: The apparatus of claim 1, wherein: the one or more light-emitting devices include a plurality of light-emitting devices; and the projection system includes a plurality of projection lenses, each projection lens of the plurality of projection lenses being configured to project light emitted by one of the plurality of light-emitting devices towards a different FOV portion of the plurality of FOV portions.

Aspect 5: The apparatus of claim 4, wherein the projection system includes one or more diffusers positioned relative to the plurality of projection lenses, the one or more diffusers being configured to diffuse the light emitted by the plurality of light-emitting devices.

Aspect 6: The apparatus of claim 4, wherein each of the plurality of projection lenses is positioned above the plurality of light-emitting devices.

Aspect 7: The apparatus of claim 1, wherein the projection system includes a segmented prism array, the segmented prism array being configured to direct the light to each FOV portion of the plurality of FOV portions.

Aspect 8: The apparatus of claim 1, wherein: the one or more light-emitting devices include a single light-emitting device; and the projection system includes a scanning mirror, wherein the scanning mirror is configured to project light emitted by the single light-emitting device towards different FOV portions of the plurality of FOV portions when oriented at different orientations.

Aspect 9: The apparatus of claim 8, wherein the scanning mirror includes a micro electro mechanical system (MEMS) mirror.

Aspect 10: The apparatus of claim 8, wherein: the scanning mirror is positioned above the single light-emitting device; and each of the different orientations of the scanning mirror corresponds to a different orientation angle between the scanning mirror and a plane of the single light-emitting device.

Aspect 11: The apparatus of claim 8, wherein the projection system includes one or more diffusers positioned relative to the scanning mirror, the one or more diffusers being configured to diffuse the light emitted by the single light-emitting device.

Aspect 12: The apparatus of claim 1, wherein the receiving system includes an array of image lenses, each image lens of the array of image lenses being configured to project, to the sensor, light associated with a different portion of the scene corresponding to a respective FOV portion of the plurality of FOV portions.

Aspect 13: The apparatus of claim 1, wherein the receiving system further comprises a filter positioned above the sensor, the filter being configured to transmit light with a frequency corresponding to a frequency of light emitted by the one or more light-emitting devices.

Aspect 14: The apparatus of claim 1, wherein the processor is configured to synchronize the projection system and the receiving system based at least in part on: sending, to the projection system, a first control signal directing the projection system to illuminate a particular FOV portion of the plurality of FOV portions; and sending, to the receiving system, a second control signal directing the receiving system to associate an illumination reflection received by the sensor with the particular FOV portion, wherein the first control signal and the second control signal are time-synchronized.

Aspect 15: The apparatus of claim 1, wherein a first FOV portion of the plurality of FOV portions partially overlaps at least a second FOV portion of the plurality of FOV portions.

Aspect 16: The apparatus of claim 1, wherein, to generate the increased resolution depth map associated with the entire FOV, the processor is configured to: generate a plurality of partial distance measurements, each of the plurality of partial distance measurements corresponding to one of the plurality of illumination reflections; and combine the plurality of partial distance measurements.

Aspect 17: The apparatus of claim 1, wherein an image resolution of the increased resolution depth map corresponds to a maximum resolution of the sensor multiplied by a number of the plurality of FOV portions.

Aspect 18: A method for high resolution time-of-flight depth imaging, the method comprising: illuminating, using one or more light-emitting devices of a projection system, a plurality of field-of-view (FOV) portions of an entire FOV of the projection system, wherein each light-emitting device of the one or more light-emitting devices is configured to illuminate at least one portion of the entire FOV; sequentially capturing, by a sensor of a receiving system, a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to a full resolution of the sensor; and generating, using the plurality of images, an increased resolution depth map associated with the entire FOV.

Aspect 19: The method of claim 18, wherein: illuminating the plurality of FOV portions includes illuminating each of the plurality of FOV portions in a sequential illumination order, the sequential illumination order including illuminating a single FOV portion at a time; receiving each illumination reflection of the plurality of illumination reflections includes receiving each reflection in a sequential receiving order that corresponds to the sequential illumination order; and further comprising generating each image of the plurality of images based on each illumination reflection of the plurality of illumination reflections.

Aspect 20: The method of claim 19, wherein illuminating each of the plurality of FOV portions in the sequential illumination order includes: illuminating a first FOV portion of the plurality of FOV portions; receiving a first illumination reflection corresponding to the first FOV portion; after receiving the first illumination reflection, illuminating a second FOV portion of the plurality of FOV portions; and receiving a second illumination reflection corresponding to the second FOV portion.

Aspect 21: The method of claim 18, wherein: the one or more light-emitting devices include a plurality of light-emitting devices; and the projection system includes a plurality of projection lenses, each projection lens of the plurality of projection lenses being configured to project light emitted by one of the plurality of light-emitting devices towards a different FOV portion of the plurality of FOV portions.

Aspect 22: The method of claim 21, wherein the projection system includes one or more diffusers positioned relative to the plurality of projection lenses, the one or more diffusers being configured to diffuse the light emitted by the plurality of light-emitting devices.

Aspect 23: The method of claim 21, wherein each of the plurality of lenses is positioned above the plurality of light-emitting devices.

Aspect 24: The method of claim 18, wherein the projection system includes a segmented prism array, the segmented prism array being configured to direct the light to each FOV portion of the plurality of FOV portions.

Aspect 25: The method of claim 18, wherein: the one or more light-emitting devices include a single light-emitting device; and the projection system includes a scanning mirror, wherein the scanning mirror is configured to project light emitted by the single light-emitting device towards different FOV portions of the plurality of FOV portions when oriented at different orientations.

Aspect 26: The method of claim 25, wherein the scanning mirror includes a micro electro mechanical system (MEMS) mirror.

Aspect 27: The method of claim 25, wherein: the scanning mirror is positioned above the single light-emitting device; and each of the different orientations of the scanning mirror corresponds to a different orientation angle between the scanning mirror and a plane of the single light-emitting device.

Aspect 28: The apparatus of claim 25, wherein the projection system includes one or more diffusers positioned relative to the scanning mirror, the one or more diffusers being configured to diffuse the light emitted by the single light-emitting device.

Aspect 29: The method of claim 18, wherein the receiving system includes an array of image lenses, each image lens of the array of image lenses being configured to project, to the sensor, light associated with a different portion of the scene corresponding to a respective FOV portion of the plurality of FOV portions.

Aspect 30: The method of claim 18, further comprising a filter positioned above the sensor, the filter being configured to transmit light with a frequency corresponding to a frequency of light emitted by the one or more light-emitting devices.

Aspect 31: The method of claim 18, further comprising synchronizing the projection system and the receiving system based at least in part on: sending, to the projection system, a first control signal directing the projection system to illuminate a particular FOV portion of the plurality of FOV portions; and sending, to the receiving system, a second control signal directing the receiving system to associate an illumination reflection received by the sensor with the particular FOV portion, wherein the first control signal and the second control signal are time-synchronized.

Aspect 32: The method of claim 18, wherein a first FOV portion of the plurality of FOV portions partially overlaps at least a second FOV portion of the plurality of FOV portions.

Aspect 33: The method of claim 18, wherein generating the increased resolution depth map associated with the entire FOV includes: generating a plurality of partial distance measurements, each of the plurality of partial distance measurements corresponding to one of the plurality of illumination reflections; and combining the plurality of partial distance measurements.

Aspect 34: The method of claim 18, wherein an image resolution of the increased resolution depth map corresponds to a maximum resolution of the sensor multiplied by a number of the plurality of FOV portions.

Aspect 35: A non-transitory computer-readable storage medium having instructions stored therein which, when executed by one or more processors, cause the one or more processors to perform operations according to any of aspects 1 to 34.

Aspect 36: An apparatus comprising means for performing operations according to any of aspects 1 to 34.

What is claimed is:

1. An apparatus for high resolution time-of-flight depth imaging, the apparatus comprising:
   a projection system including one or more light-emitting devices, each light-emitting device of the one or more light-emitting devices configured to illuminate at least one portion of an entire field-of-view (FOV) of the projection system, wherein the entire FOV includes a plurality of FOV portions;
   a receiving system including a sensor configured to sequentially capture a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to a full resolution of the sensor; and
   a processor configured to combine the plurality of images to generate an increased resolution depth map associated with the entire FOV, the increased resolution depth map including a resolution greater than the full resolution of the sensor.

2. The apparatus of claim 1, wherein:
   the projection system is configured to illuminate each of the plurality of FOV portions in a sequential illumination order, the sequential illumination order including illuminating a single FOV portion at a time; and
   the receiving system is configured to receive each illumination reflection of the plurality of illumination reflections in a sequential receiving order that corresponds to the sequential illumination order and to generate each image of the plurality of images based on each illumination reflection.

3. The apparatus of claim 2, wherein, to illuminate each of the plurality of FOV portions in the sequential illumination order, the projection system is configured to:
   illuminate a first FOV portion of the plurality of FOV portions;
   receive a first illumination reflection corresponding to the first FOV portion;
   after receiving the first illumination reflection, illuminate a second FOV portion of the plurality of FOV portions; and
   receive a second illumination reflection corresponding to the second FOV portion.

4. The apparatus of claim 1, wherein:
   the one or more light-emitting devices include a plurality of light-emitting devices; and
   the projection system includes a plurality of projection lenses, each projection lens of the plurality of projection lenses being configured to project light emitted by one of the plurality of light-emitting devices towards a different FOV portion of the plurality of FOV portions.

5. The apparatus of claim 4, wherein the projection system includes one or more diffusers positioned relative to the plurality of projection lenses, the one or more diffusers being configured to diffuse the light emitted by the plurality of light-emitting devices.

6. The apparatus of claim 4, wherein each of the plurality of projection lenses is positioned above the plurality of light-emitting devices.

7. The apparatus of claim 1, wherein the projection system includes a segmented prism array, the segmented prism array being configured to direct the light to each FOV portion of the plurality of FOV portions.

8. The apparatus of claim 1, wherein:
   the one or more light-emitting devices include a single light-emitting device; and
   the projection system includes a scanning mirror, wherein the scanning mirror is configured to project light emitted by the single light-emitting device towards different FOV portions of the plurality of FOV portions when oriented at different orientations.

9. The apparatus of claim 8, wherein the scanning mirror includes a micro electro mechanical system (MEMS) mirror.

10. The apparatus of claim 8, wherein:
    the scanning mirror is positioned above the single light-emitting device; and
    each of the different orientations of the scanning mirror corresponds to a different orientation angle between the scanning mirror and a plane of the single light-emitting device.

11. The apparatus of claim 8, wherein the projection system includes one or more diffusers positioned relative to the scanning mirror, the one or more diffusers being configured to diffuse the light emitted by the single light-emitting device.

12. The apparatus of claim 1, wherein the receiving system includes an array of image lenses, each image lens of the array of image lenses being configured to project, to the sensor, light associated with a different portion of a scene corresponding to a respective FOV portion of the plurality of FOV portions.

13. The apparatus of claim 1, wherein the receiving system further comprises a filter positioned above the sensor, the filter being configured to transmit light with a frequency corresponding to a frequency of light emitted by the one or more light-emitting devices.

14. The apparatus of claim 1, wherein the processor is configured to synchronize the projection system and the receiving system based at least in part on:
  sending, to the projection system, a first control signal directing the projection system to illuminate a particular FOV portion of the plurality of FOV portions; and
  sending, to the receiving system, a second control signal directing the receiving system to associate an illumination reflection received by the sensor with the particular FOV portion, wherein the first control signal and the second control signal are time-synchronized.

15. The apparatus of claim 1, wherein a first FOV portion of the plurality of FOV portions partially overlaps at least a second FOV portion of the plurality of FOV portions.

16. The apparatus of claim 1, wherein, to generate the increased resolution depth map associated with the entire FOV, the processor is configured to:
  generate a plurality of partial distance measurements, each of the plurality of partial distance measurements corresponding to one of the plurality of illumination reflections; and
  combine the plurality of partial distance measurements.

17. The apparatus of claim 1, wherein an image resolution of the increased resolution depth map corresponds to a maximum resolution of the sensor multiplied by a number of the plurality of FOV portions.

18. A method for high resolution time-of-flight depth imaging, the method comprising:
  illuminating, using one or more light-emitting devices of a projection system, a plurality of field-of-view (FOV) portions of an entire FOV of the projection system, wherein each light-emitting device of the one or more light-emitting devices is configured to illuminate at least one portion of the entire FOV;
  sequentially capturing, by a sensor of a receiving system, a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to a full resolution of the sensor; and
  combine the plurality of images to generate an increased resolution depth map associated with the entire FOV, the increased resolution depth map including a resolution greater than the full resolution of the sensor.

19. The method of claim 18, wherein:
  illuminating the plurality of FOV portions includes illuminating each of the plurality of FOV portions in a sequential illumination order, the sequential illumination order including illuminating a single FOV portion at a time;
  receiving each illumination reflection of the plurality of illumination reflections includes receiving each reflection in a sequential receiving order that corresponds to the sequential illumination order; and
  further comprising generating each image of the plurality of images based on each illumination reflection of the plurality of illumination reflections.

20. The method of claim 19, wherein illuminating each of the plurality of FOV portions in the sequential illumination order includes:
  illuminating a first FOV portion of the plurality of FOV portions;
  receiving a first illumination reflection corresponding to the first FOV portion;
  after receiving the first illumination reflection, illuminating a second FOV portion of the plurality of FOV portions; and
  receiving a second illumination reflection corresponding to the second FOV portion.

21. The method of claim 18, wherein:
  the one or more light-emitting devices include a plurality of light-emitting devices; and
  the projection system includes a plurality of projection lenses, each projection lens of the plurality of projection lenses being configured to project light emitted by one of the plurality of light-emitting devices towards a different FOV portion of the plurality of FOV portions.

22. The method of claim 21, wherein the projection system includes one or more diffusers positioned relative to the plurality of projection lenses, the one or more diffusers being configured to diffuse the light emitted by the plurality of light-emitting devices.

23. The method of claim 21, wherein each of the plurality of projection lenses is positioned above the plurality of light-emitting devices.

24. The method of claim 18, wherein the projection system includes a segmented prism array, the segmented prism array being configured to direct the light to each FOV portion of the plurality of FOV portions.

25. The method of claim 18, wherein:
  the one or more light-emitting devices include a single light-emitting device; and
  the projection system includes a scanning mirror, wherein the scanning mirror is configured to project light emitted by the single light-emitting device towards different FOV portions of the plurality of FOV portions when oriented at different orientations.

26. The method of claim 25, wherein the scanning mirror includes a micro electro mechanical system (MEMS) mirror.

27. The method of claim 25, wherein:
  the scanning mirror is positioned above the single light-emitting device; and
  each of the different orientations of the scanning mirror corresponds to a different orientation angle between the scanning mirror and a plane of the single light-emitting device.

28. The method of claim 25, wherein the projection system includes one or more diffusers positioned relative to the scanning mirror, the one or more diffusers being configured to diffuse the light emitted by the single light-emitting device.

29. The method of claim 18, wherein the receiving system includes an array of image lenses, each image lens of the array of image lenses being configured to project, to the sensor, light associated with a different portion of a scene corresponding to a respective FOV portion of the plurality of FOV portions.

30. The method of claim 18, further comprising a filter positioned above the sensor, the filter being configured to transmit light with a frequency corresponding to a frequency of light emitted by the one or more light-emitting devices.

31. The method of claim 18, further comprising synchronizing the projection system and the receiving system based at least in part on:
  sending, to the projection system, a first control signal directing the projection system to illuminate a particular FOV portion of the plurality of FOV portions; and
  sending, to the receiving system, a second control signal directing the receiving system to associate an illumination reflection received by the sensor with the particular FOV portion, wherein the first control signal and the second control signal are time-synchronized.

32. The method of claim 18, wherein a first FOV portion of the plurality of FOV portions partially overlaps at least a second FOV portion of the plurality of FOV portions.

33. The method of claim 18, wherein generating the increased resolution depth map associated with the entire FOV includes:
  generating a plurality of partial distance measurements, each of the plurality of partial distance measurements corresponding to one of the plurality of illumination reflections; and
  combining the plurality of partial distance measurements.

34. The method of claim 18, wherein an image resolution of the increased resolution depth map corresponds to a maximum resolution of the sensor multiplied by a number of the plurality of FOV portions.

35. A non-transitory computer-readable storage medium for high resolution time-of-flight depth imaging, the non-transitory computer-readable storage medium comprising:
  instructions stored therein which, when executed by one or more processors, cause the one or more processors to:
    illuminate, using one or more light-emitting devices of a projection system, a plurality of field-of-view (FOV) portions of an entire FOV of the projection system, wherein each light-emitting device of the one or more light-emitting devices is configured to illuminate at least one portion of the entire FOV;
    sequentially capture, by a sensor of a receiving system, a plurality of images based on a plurality of illumination reflections corresponding to light emitted by the one or more light-emitting devices, wherein each image of the plurality of images corresponds to one of the plurality of FOV portions, and wherein an image resolution associated with each image of the plurality of images corresponds to full a resolution of the sensor; and
    combine the plurality of images to generate an increased resolution depth map associated with the entire FOV, the increased resolution depth map including a resolution greater than the full resolution of the sensor.

* * * * *